United States Patent
Lee et al.

(10) Patent No.: US 10,218,206 B2
(45) Date of Patent: Feb. 26, 2019

(54) CHARGING VOLATAGE CONFIGURING METHOD FOR WIRELESS CHARGING AND WIRELESS POWER RECEPTION UNIT

(71) Applicant: Samsung Electronics Co., Ltd., Gyeonggi-do (KR)

(72) Inventors: Kyung-Woo Lee, Seoul (KR); Kang-Ho Byun, Gyeonggi-do (KR); Hee-Won Jung, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 463 days.

(21) Appl. No.: 14/906,200

(22) PCT Filed: Jul. 18, 2014

(86) PCT No.: PCT/KR2014/006529
§ 371 (c)(1),
(2) Date: Jan. 19, 2016

(87) PCT Pub. No.: WO2015/009096
PCT Pub. Date: Jan. 22, 2015

(65) Prior Publication Data
US 2016/0181856 A1    Jun. 23, 2016

(30) Foreign Application Priority Data
Jul. 19, 2013 (KR) .................. 10-2013-0085527

(51) Int. Cl.
H02J 50/80    (2016.01)
H02J 7/02     (2016.01)
(Continued)

(52) U.S. Cl.
CPC ............. *H02J 7/025* (2013.01); *H02J 7/045* (2013.01); *H02J 17/00* (2013.01); *H02J 50/10* (2016.02);
(Continued)

(58) Field of Classification Search
CPC .. H02J 50/10; H02J 50/12; H02J 50/20; H02J 50/80
See application file for complete search history.

(56) References Cited

U.S. PATENT DOCUMENTS 9,806,564 B2 * 10/2017 Leabman .............. H02M 3/156
2009/0042525 A1    2/2009 Rajagopal et al.
(Continued)

FOREIGN PATENT DOCUMENTS

WO    WO 2012/081749    6/2012

OTHER PUBLICATIONS

Texas Instruments: "Highly Integrated Wireless Receiver Qi (WPC V1.1) Compliant Power Supply", XP055344917, Mar. 31, 2013, 42 pages.
(Continued)

*Primary Examiner* — Fritz M Fleming
(74) *Attorney, Agent, or Firm* — The Farrell Law Firm, P.C.

(57) ABSTRACT

The present disclosure relates to a charging voltage configuring method for wireless charging to control a charging voltage of a wireless power reception unit in a wireless charging network. A charging voltage configuration method for wireless charging by a wireless Power Reception Unit (PRU) which receives wireless charging power from a wireless Power Transmission Unit (PTU) according to the present disclosure may include: measuring charging power received from the wireless power reception unit; when the measured charging power is smaller than a minimum power level for charging initiation or a difference between the measured charging power and the minimum power level is within a predetermined range, determining a voltage configuration value upwardly adjusted by a pre-configured level in comparison with a pre-configured voltage configuration (Continued)

value; and transmitting the determined voltage configuration value to the wireless power transmission unit.

15 Claims, 18 Drawing Sheets

(51) Int. Cl.
*H02J 50/12* (2016.01)
*H02J 17/00* (2006.01)
*H02J 7/04* (2006.01)
*H02J 50/10* (2016.01)
*H02J 50/40* (2016.01)
*H02J 50/60* (2016.01)
*H02J 7/00* (2006.01)

(52) U.S. Cl.
CPC .............. *H02J 50/12* (2016.02); *H02J 50/40* (2016.02); *H02J 50/60* (2016.02); *H02J 50/80* (2016.02); *H02J 2007/0096* (2013.01)

(56) References Cited

U.S. PATENT DOCUMENTS

| | | |
|---|---|---|
| 2013/0062959 A1 | 3/2013 | Lee et al. |
| 2013/0099734 A1 | 4/2013 | Lee et al. |
| 2013/0127410 A1 | 5/2013 | Park et al. |
| 2013/0154387 A1 | 6/2013 | Lee et al. |
| 2013/0264880 A1 | 10/2013 | Kim et al. |
| 2014/0152117 A1* | 6/2014 | Sankar .................... H03H 7/40 |
| | | 307/104 |

OTHER PUBLICATIONS

Texas Instruments: "Wireless Receiver-Side communication and Power Monitoring IC for Wireless Power (MSP430BQ1010)", XP055344804, Dec. 31, 2010, 26 pages.
European Search Report dated Feb. 21, 2017 issued in counterpart application No. 14825672.0-1804, 9 pages.
PCT/ISA/210 Search Report issued on PCT/KR2014/006529 (pp. 3).
PCT/ISA/237 Written Opinion issued on PCT/KR2014/006529 (pp. 5).

\* cited by examiner

[Fig. 1]
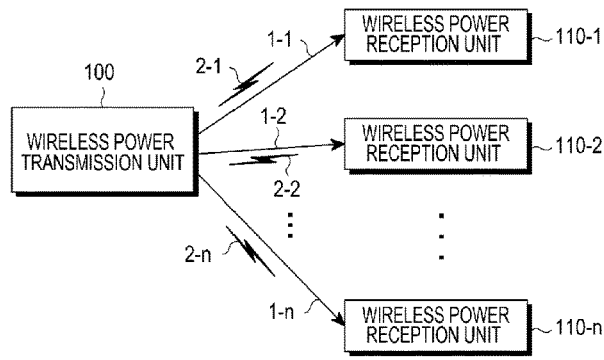
[Fig. 2]
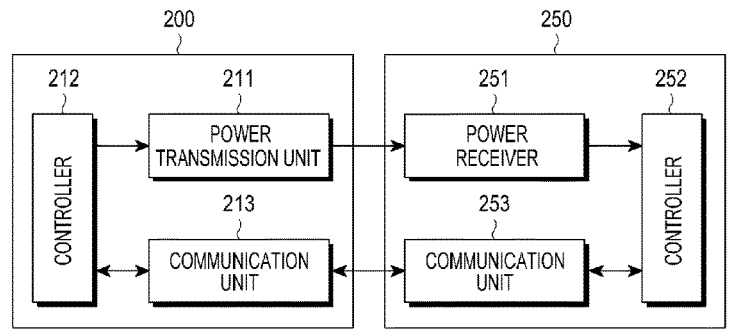
[Fig. 3]
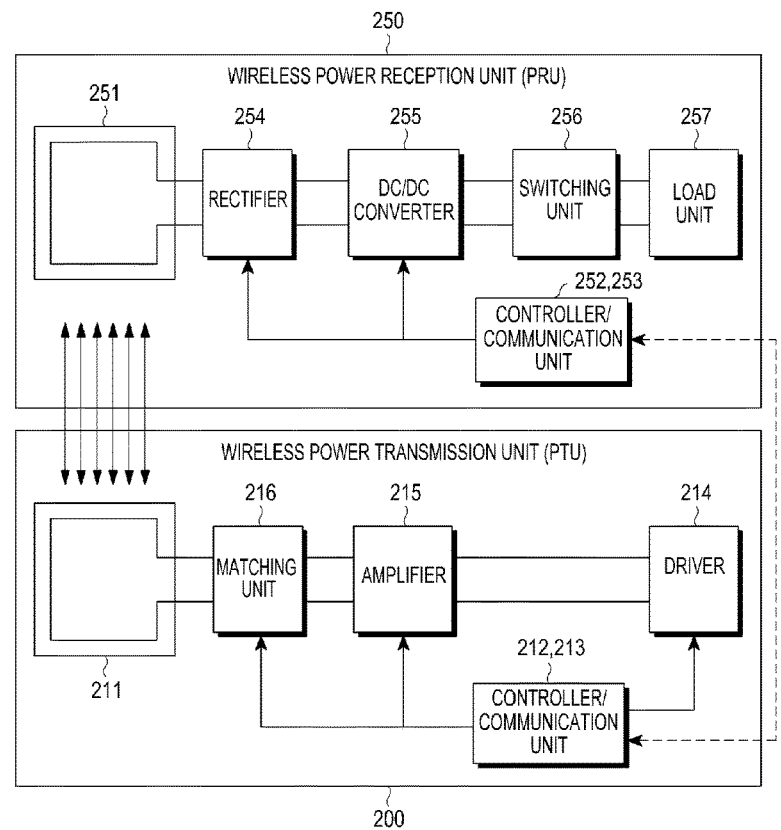

[Fig. 4]
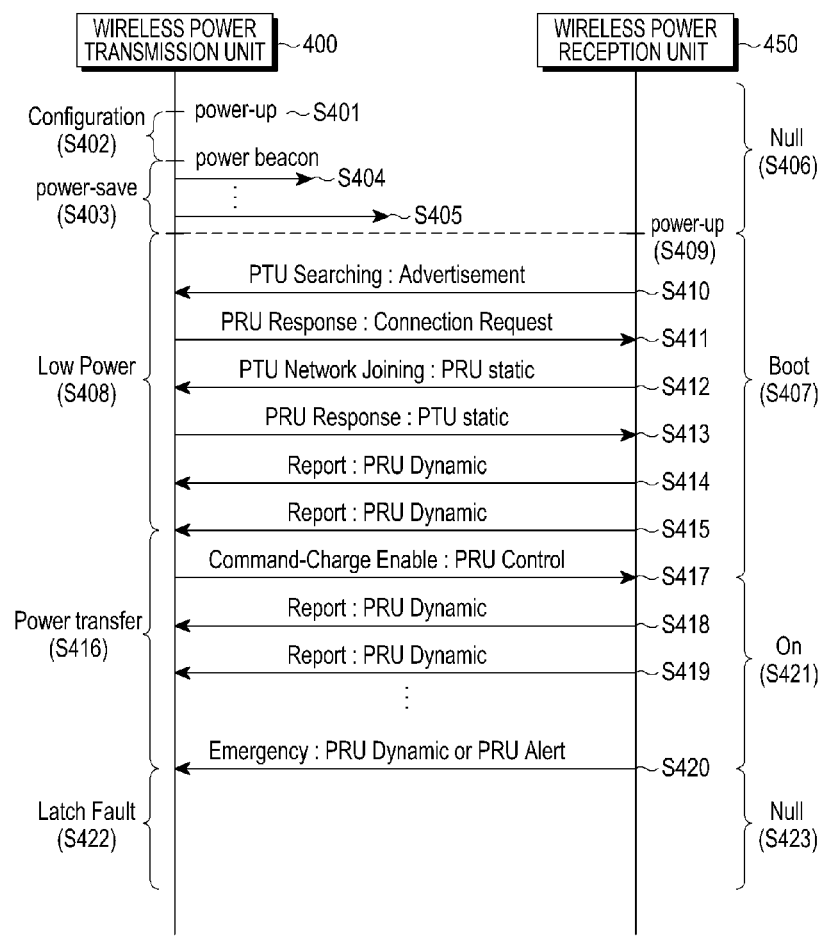

[Fig. 5]
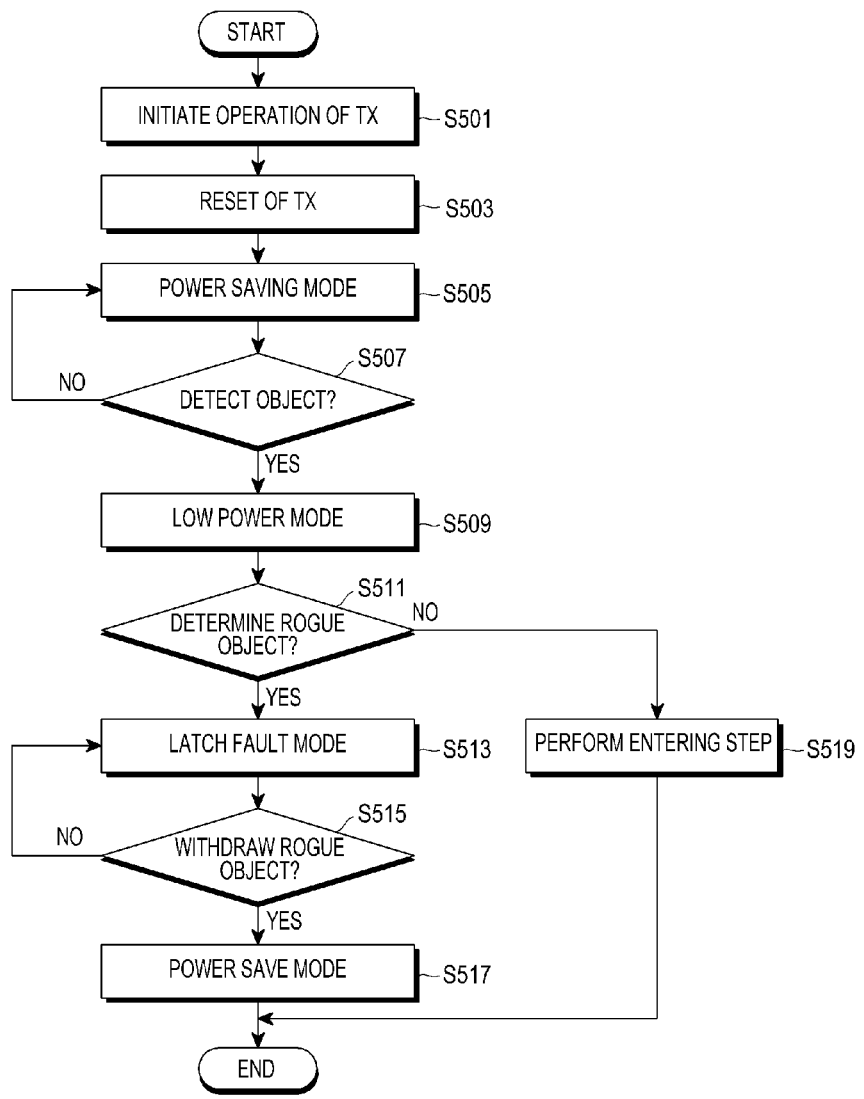

[Fig. 6]
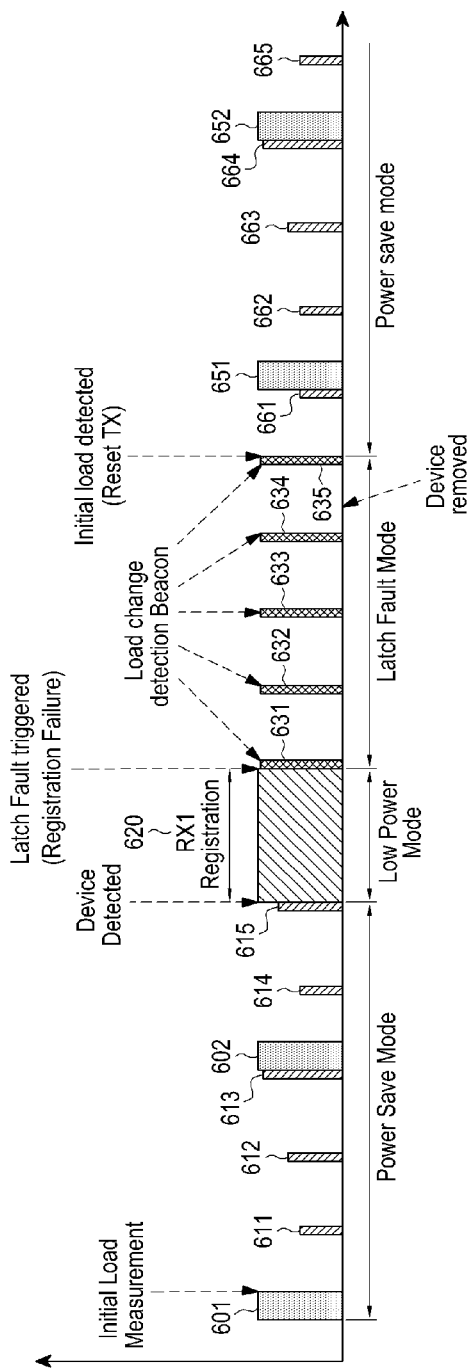

[Fig. 7]
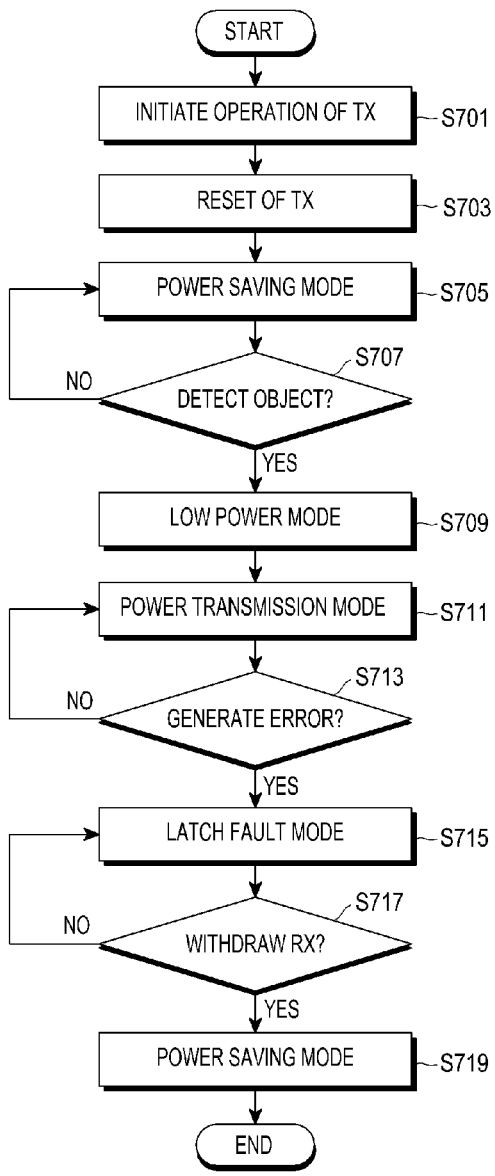

[Fig. 8]
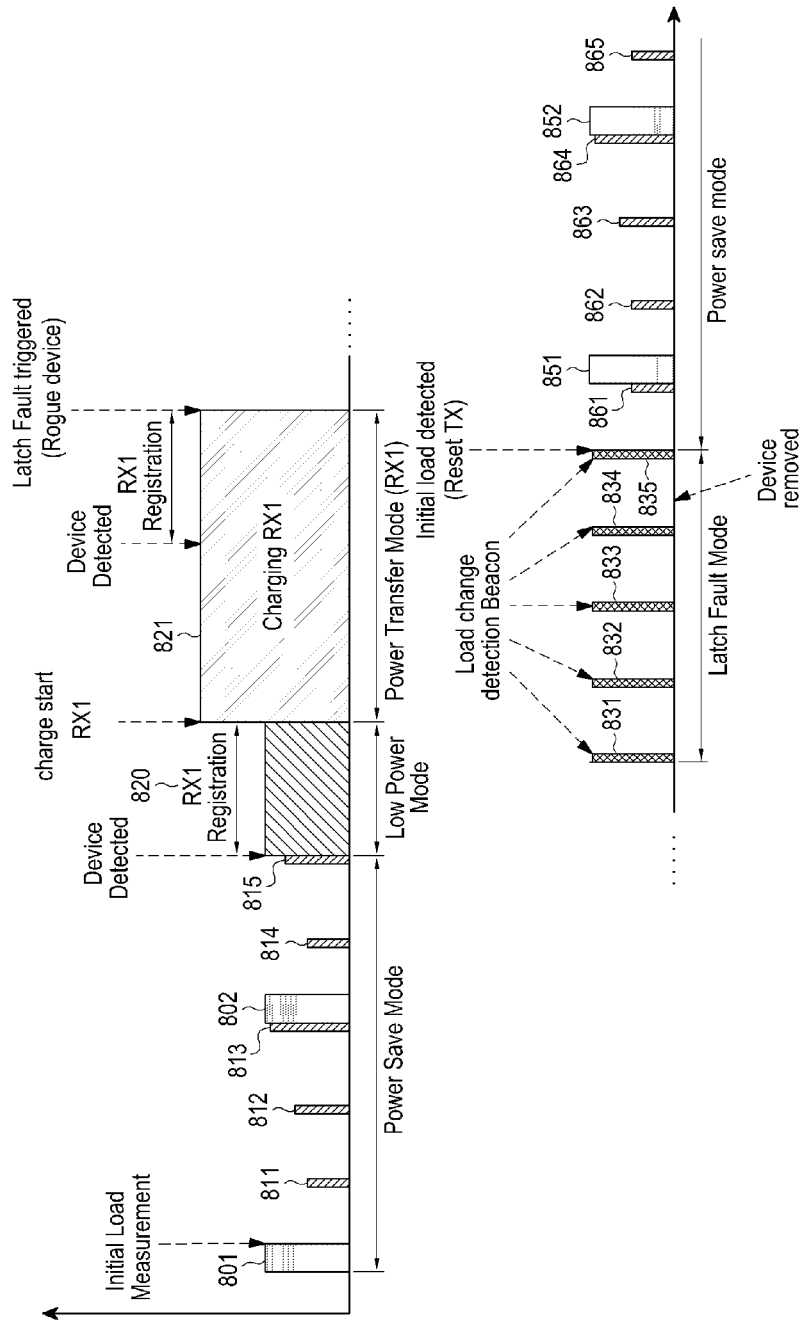

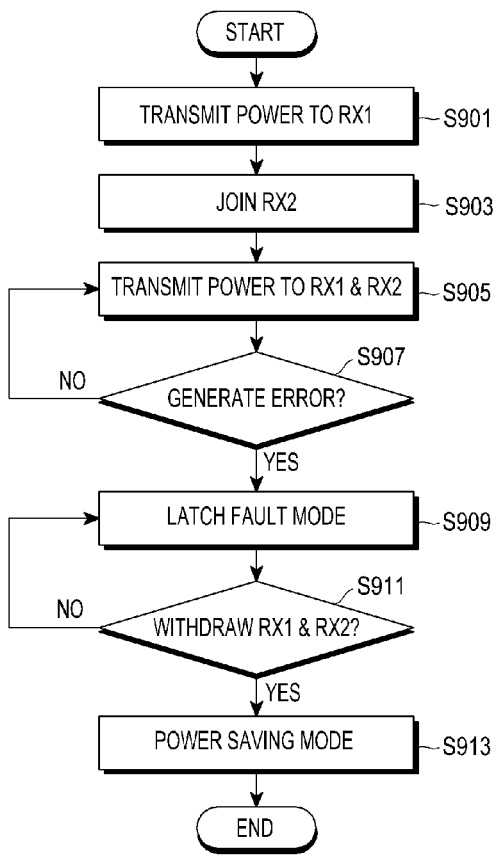
[Fig. 9]

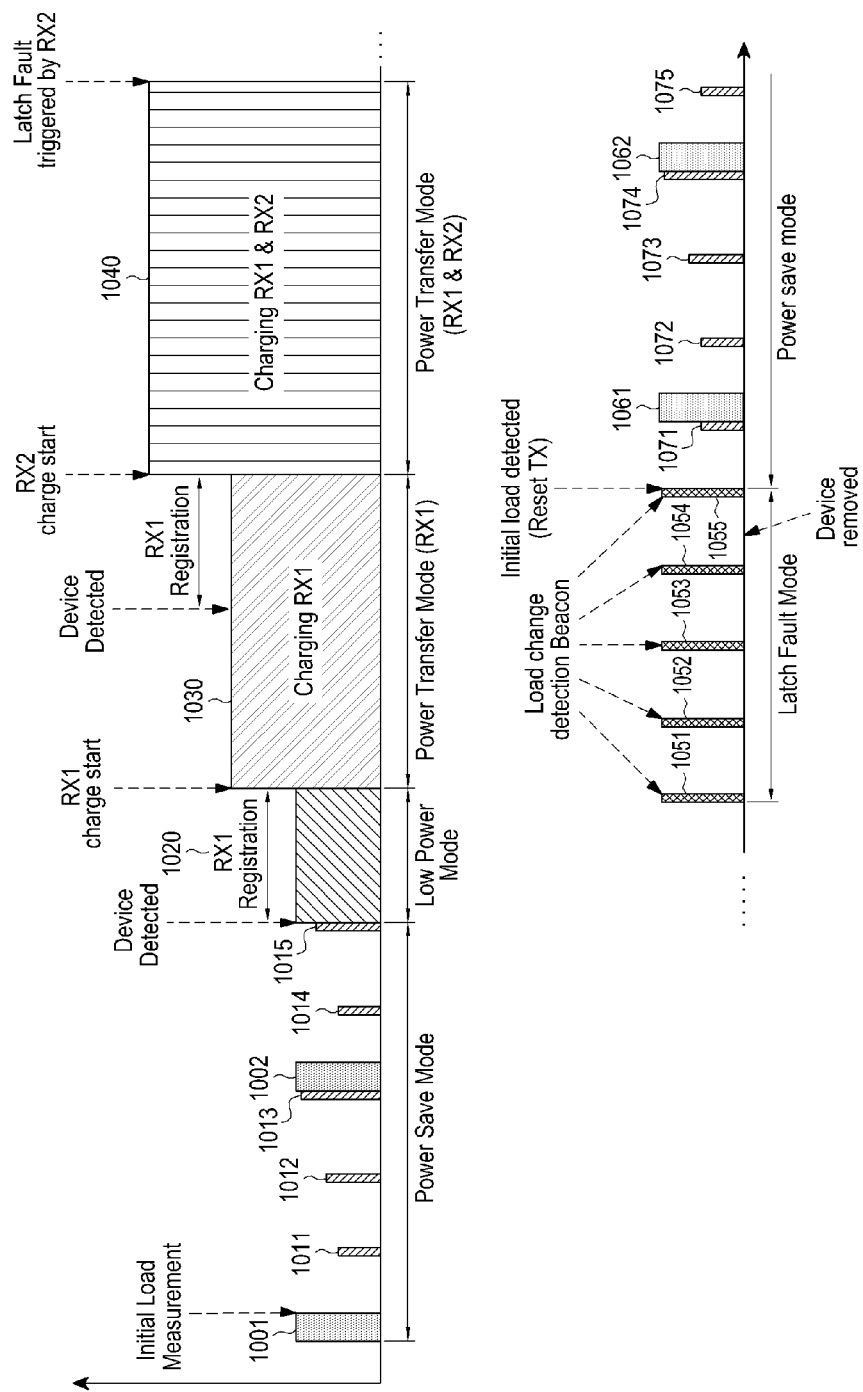
[Fig. 10]

[Fig. 11]
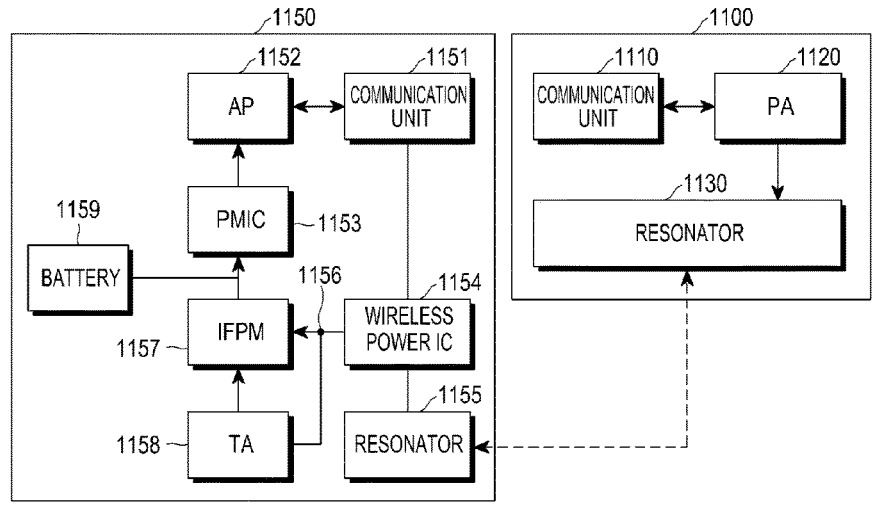
[Fig. 12]
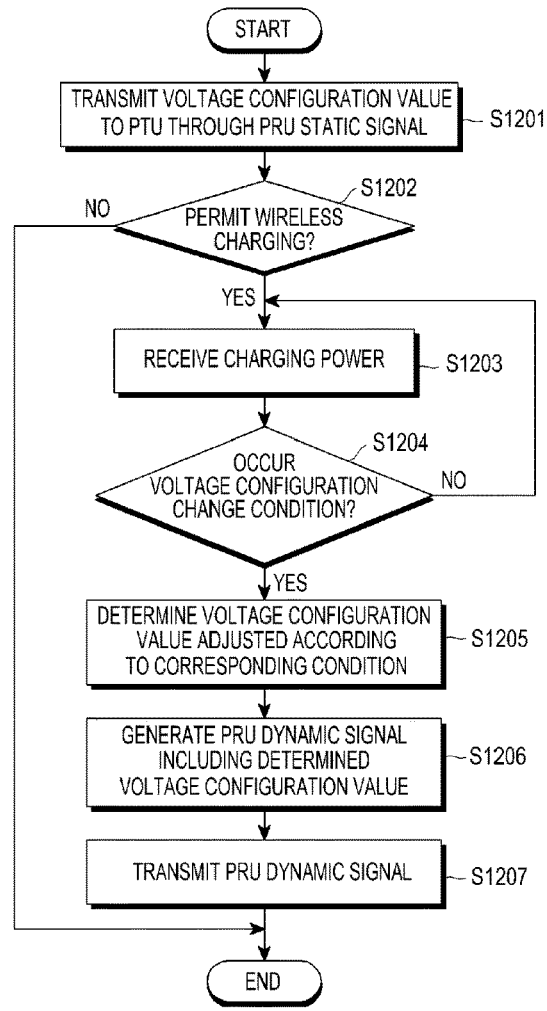

[Fig. 13]
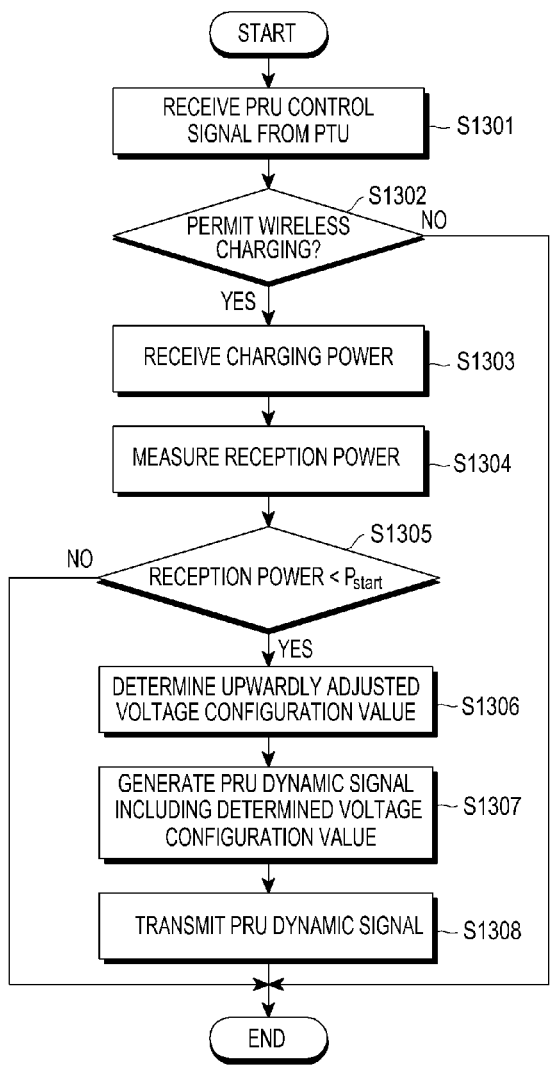

[Fig. 14]
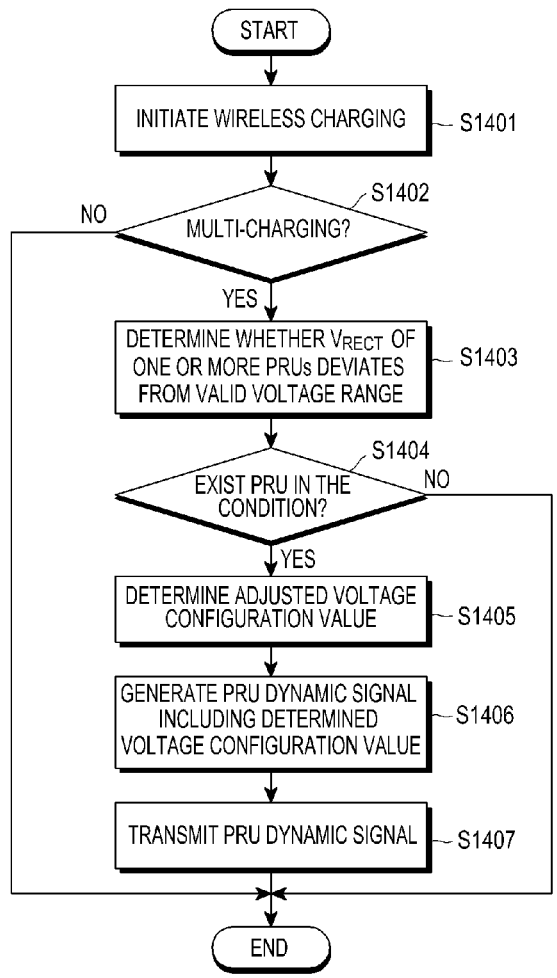

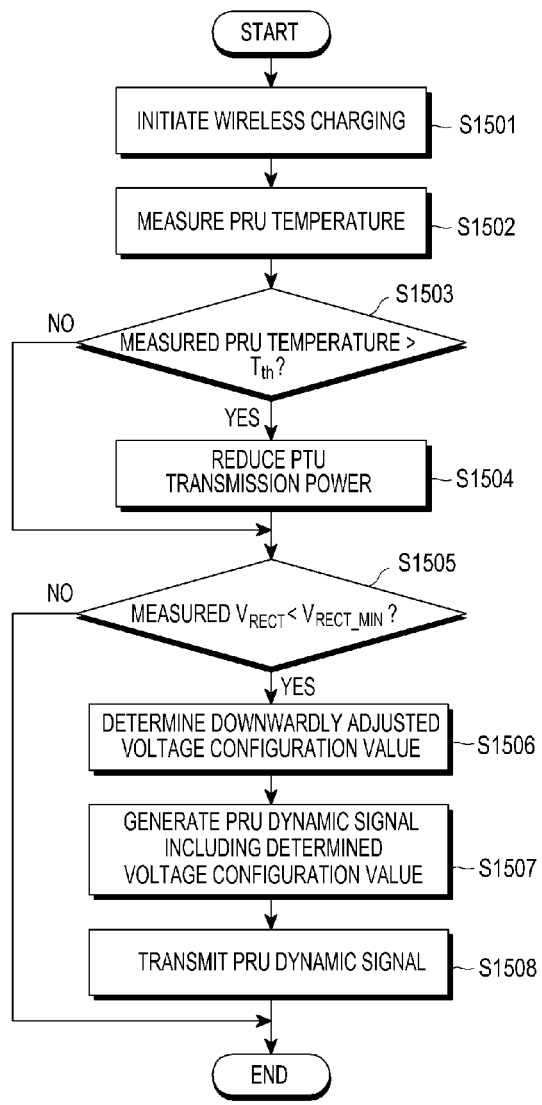
[Fig. 15]

[Fig. 16]
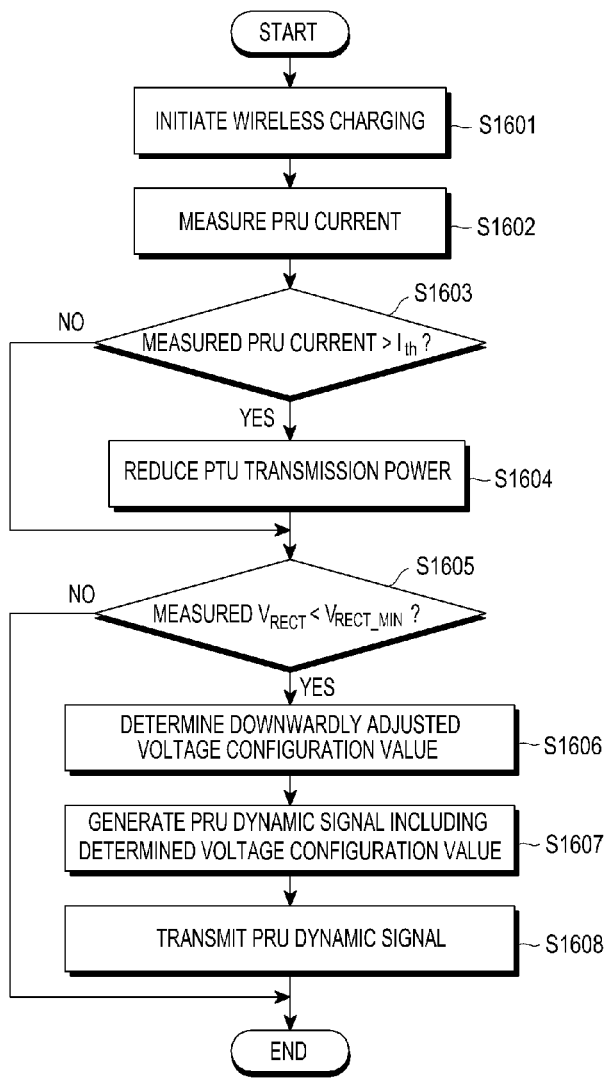

[Fig. 17]
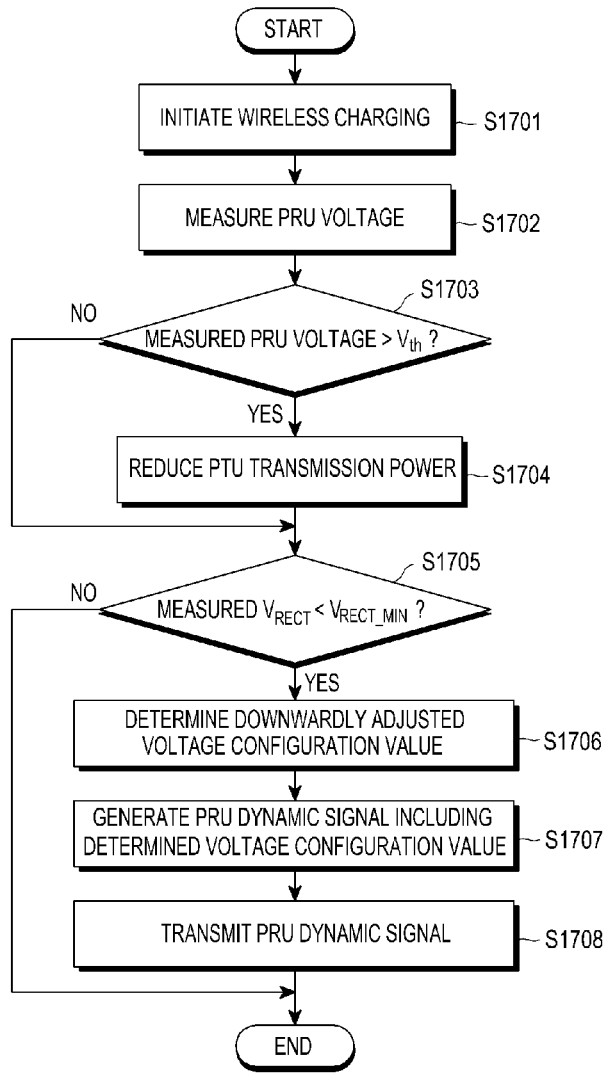

[Fig. 18]
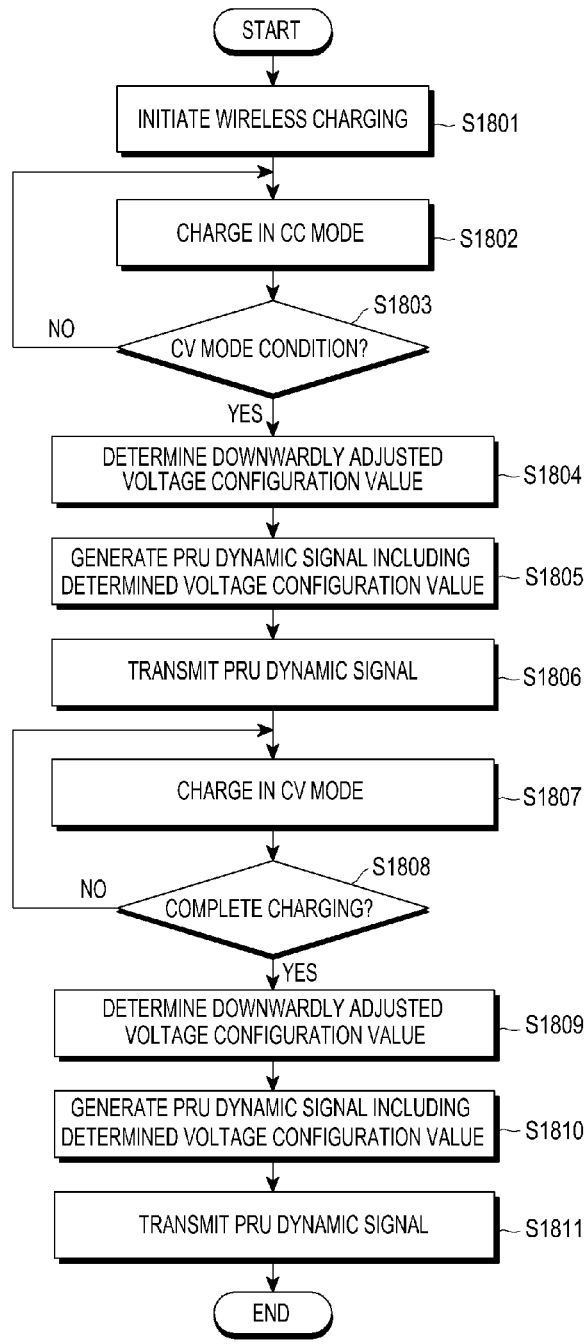

[Fig. 19]
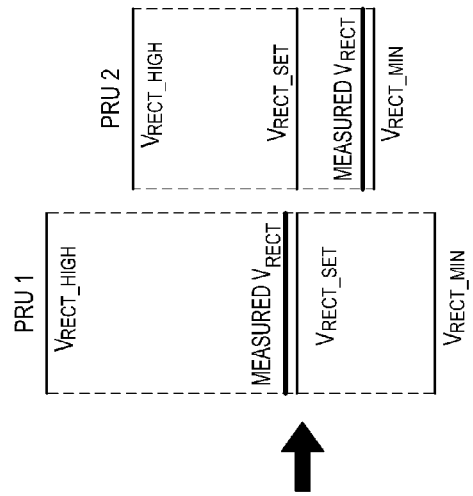
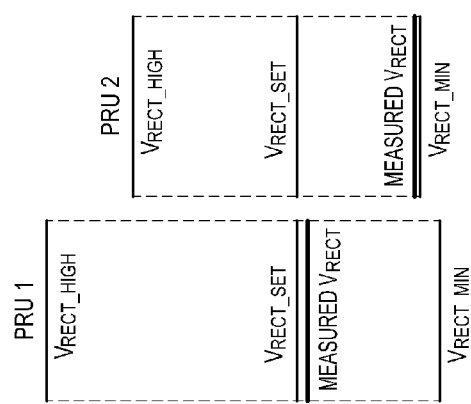
[Fig. 20]
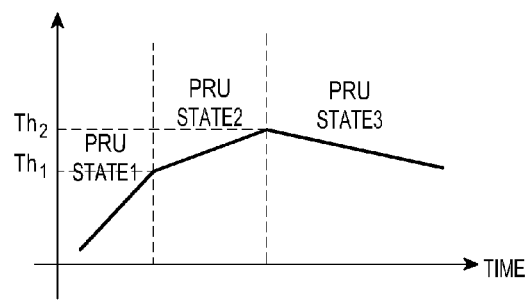

[Fig. 21]
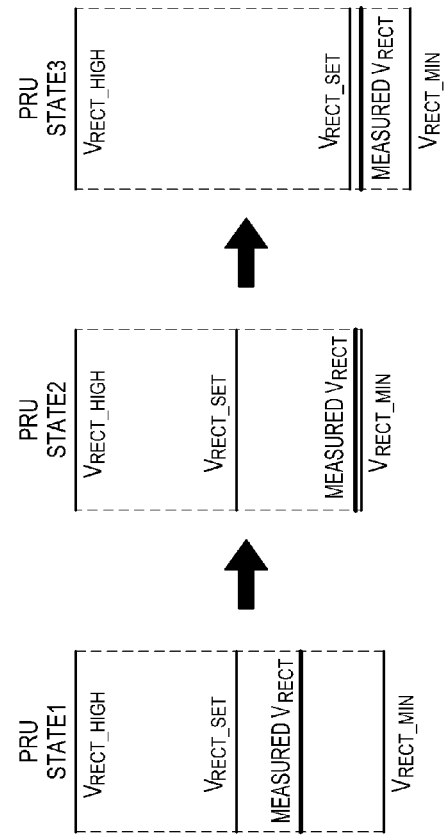
[Fig. 22]
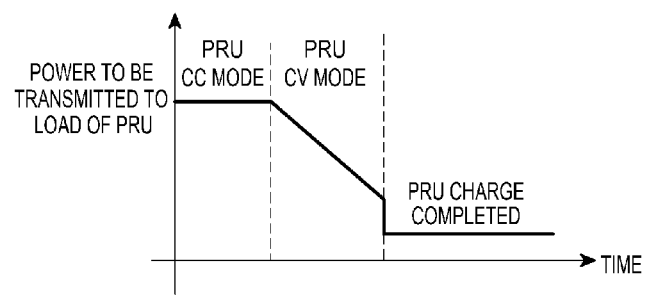

[Fig. 23]
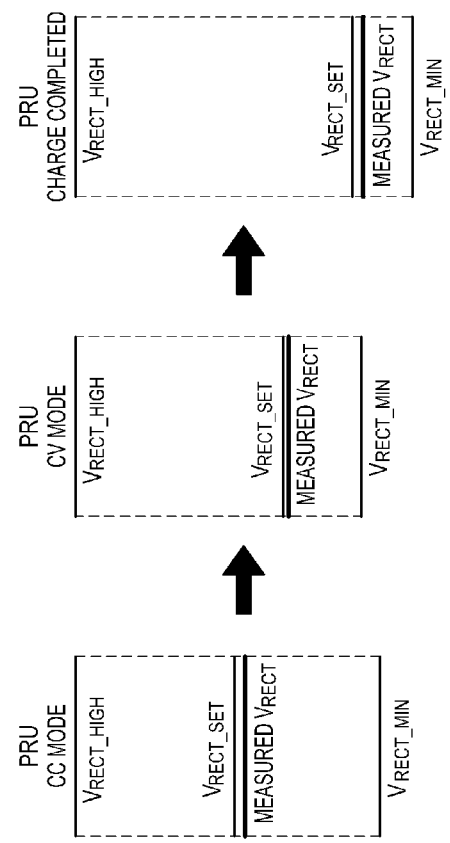

CHARGING VOLATAGE CONFIGURING METHOD FOR WIRELESS CHARGING AND WIRELESS POWER RECEPTION UNIT

PRIORITY

This application is a National Phase Entry of PCT International Application No. PCT/KR2014/006529, which was filed on Jul. 18, 2014, and claims priority to Korean Patent Application No. 10-2013-0085527, which was filed on Jul. 19, 2013, the contents of which are incorporated herein by reference.

TECHNICAL FIELD

The present disclosure relates to a wireless charging, and more particularly, to a charging voltage configuring method for wireless charging to control a charging voltage of a wireless power reception unit in a wireless charging network and the wireless power reception unit.

BACKGROUND ART

Mobile terminals such as a mobile phone, a Personal Digital Assistant (PDA) and the like are driven with rechargeable batteries due to their nature, and the battery of the mobile terminal is charged through supplied electronic energy by using a separate charging apparatus. Typically, the charging device and the battery have separate contact terminals at an exterior thereof, respectively, and are electrically connected with each other by contacting the contact terminals.

However, since the contact terminal is outwardly protruded in such a contact type charging scheme, the contact terminal is easily contaminated by foreign substances and thus the battery charging is not correctly performed. Further, the battery charging may also not be correctly performed in a case where the contact terminal is exposed to moisture.

Recently, a wireless charging or a non-contact charging technology is developed and used for electronic devices to solve the above-mentioned problem.

Such a wireless charging technology employs wireless power transmission/reception, and corresponds to, for example, a system in which a battery can be automatically charged when a portable phone is not connected to a separate charging connector but merely placed on a charging pad. Generally, the wireless charging technology is applied to a wireless electronic toothbrush or a wireless electronic shaver and has been made known to the public. Accordingly, a waterproof function can be improved since electronic products are wirelessly charged through the wireless charging technology, and the portability of electronic devices can be increased since there is no need to provide a wired charging apparatus. Therefore, technologies related to the wireless charging technology are expected to be significantly developed in the coming age of electric cars.

The wireless charging technology largely includes an electromagnetic induction scheme using a coil, a resonance scheme using a resonance, and an RF/microwave radiation scheme converting electrical energy to a microwave and then transmitting the microwave.

It is considered up to now that the electromagnetic induction scheme is mainstream, but it is expected that the day will come when all electronic products are wirelessly charged, anytime and anywhere, without a wire in the near future on the strength of recent successful experiments for wirelessly transmitting power to a destination spaced away by dozens of meters through the use of microwaves at home and abroad.

A power transmission method through the electromagnetic induction corresponds to a scheme of transmitting power between a first coil and a second coil. When a magnet is moved in a coil, induction current is generated. By using the induction current, a magnetic field is generated at a transmission side, and electric current is induced according to a change of the magnetic field so as to make energy at a reception side. The phenomenon is referred to as magnetic induction, and the power transmission method using magnetic induction has high energy transmission efficiency.

With respect to the resonance scheme, Prof. Soljacic of MIT announced "Coupled Mode Theory" in 2005, in which electricity is wirelessly transferred using a power transmission principle of the resonance scheme even if a device to be charged is separated from a charging device by several meters. The wireless charging system of MIT uses a physical concept of resonance in which a wine glass near to a tuning fork resonates with an identical vibration frequency when the tuning fork resonates. The research team made an electromagnetic wave containing electrical energy resonate instead of making sound resonate. The resonated electrical energy is directly transferred only when there is a device having a resonance frequency and parts of electrical energy which are not used are reabsorbed into an electromagnetic field instead of being spread in the air, so that it is considered that the electrical energy does not affect surrounding machines or people unlike other electromagnetic waves.

According to the wireless charging with the resonance scheme, when a wireless Power Transmission Unit (PTU) has been communicated with a wireless Power Reception Unit (PRU), the PRU and PTU exchange own static parameters and then transmit information on own state to a counterpart.

In this event, a value included in the static parameter is configured with reference to a Continuous Current (CC) mode of a battery which is the most common state and is previously stored in a memory of the PRU. When power has been transmitted from the PTU so that a communication with the PRU has been performed, the power is transmitted to the PTU.

DISCLOSURE OF INVENTION

Technical Problem

However, the value included in the static parameter is a value configured by assuming a general charging state so that it is difficult to cause the value included in the static parameter to be uniformly applied in various charging situations including a charging initiation state.

Therefore, a method of making a charging voltage configuration value configured for the wireless charging of the wireless power reception unit be efficiently configured according to each charging situation and making the configured value be transmitted to a wireless power transmission unit has been required.

Solution to Problem

An aspect of the present disclosure is to provide a charging voltage configuration method for an effective wireless charging by determining a voltage configuration value corresponding to a corresponding situation depending on a charging situation of a wireless power reception unit, including the determined voltage configuration value in a PRU dynamic signal, and transmitting the determined voltage configuration value to a wireless transmission unit.

In accordance with an aspect of the present disclosure, a charging voltage configuration method for wireless charging by a wireless Power Reception Unit (PRU) which receives wireless charging power from a wireless Power Transmission Unit (PTU) may include: measuring charging power received from the wireless power reception unit; when the measured charging power is smaller than a minimum power level for charging initiation or a difference between the measured charging power and the minimum power level is within a predetermined range, determining a voltage configuration value upwardly adjusted by a pre-configured level in comparison with a pre-configured voltage configuration value; and transmitting the determined voltage configuration value to the wireless power transmission unit.

The determined voltage configuration value may be included in a PRU dynamic signal and transmitted.

The voltage configuration value may be at least one value among a minimum voltage value $V_{RECT\_MIN}$ of a rear end of a rectifier of the wireless power reception unit, an optimum voltage value $V_{RECT\_SET}$ of the rear end of the rectifier of the wireless power reception unit, and a maximum voltage value $V_{RECT\_HIGH}$ of the rear end of the rectifier of the wireless power reception unit.

The measuring of the charging power may include measuring the charging power at a rear end of the rectifier of the wireless power reception unit.

In accordance with another aspect of the present disclosure, a charging voltage configuration method for wireless charging by a wireless Power Reception Unit (PRU) which receives wireless charging power from a wireless Power Transmission Unit (PTU) may include: determining whether a charging voltage of the wireless power receiver deviates from a pre-configured valid voltage range; determining a voltage configuration value adjusted by a pre-configured level in comparison with a pre-configuration voltage configuration value when the charging voltage deviates from the valid voltage range; and transmitting the determined voltage configuration value to the wireless power transmission unit.

The determined voltage configuration value may be included in a PRU dynamic signal and be transmitted.

The determined voltage configuration value may include determining downwardly adjusted configuration value by a per-configured level.

The determined voltage configuration value may include determining upwardly adjusted configuration value by a per-configured level.

The voltage configuration value may be at least one value among a minimum voltage value $V_{RECT\_MIN}$ of a rear end of a rectifier of the wireless power reception unit, an optimum voltage value $V_{RECT\_SET}$ of the rear end of the rectifier of the wireless power reception unit, and a maximum voltage value $V_{RECT\_HIGH}$ of the rear end of the rectifier of the wireless power reception unit.

In accordance with another aspect of the present disclosure, a charging power transmitting method of a wireless Power Transmission Unit (PTU) which allows a wireless Power Reception Unit (PRU) to be charged may include: detecting temperature information and transmitting the information to the wireless power transmission unit; measuring a voltage by the wireless power received from the wireless power transmission unit; reducing a charging voltage to be transmitted from the wireless power transmission unit according to an increasement of the measure temperature and determining a voltage configuration value downwardly adjusted by a pre-configured level in comparison with the pre-configured voltage configuration value when the measured voltage is smaller than a minimum voltage value $V_{RECT\_MIN}$ or a difference between the measured voltage and the minimum voltage value is within a pre-configured range, and transmitting the determined voltage configuration value to the wireless power transmission.

The determined voltage configuration value may be included in a PRU dynamic signal and be transmitted.

The voltage configuration value may be at least one value among a minimum voltage value $V_{RECT\_MIN}$ of a rear end of a rectifier of the wireless power reception unit, an optimum voltage value $V_{RECT\_SET}$ of the rear end of the rectifier of the wireless power reception unit, and a maximum voltage value $V_{RECT\_HIGH}$ of the rear end of the rectifier of the wireless power reception unit.

The determined voltage configuration value may be included in a PRU dynamic signal and be transmitted.

The voltage configuration value may be at least one value among a minimum voltage value $V_{RECT\_MIN}$ of a rear end of a rectifier of the wireless power reception unit, an optimum voltage value $V_{RECT\_SET}$ of the rear end of the rectifier of the wireless power reception unit, and a maximum voltage value $V_{RECT\_HIGH}$ of the rear end of the rectifier of the wireless power reception unit.

In accordance with another aspect of the present disclosure, a charging power transmitting method of a wireless Power Transmission Unit (PTU) which allows a wireless Power Reception Unit (PRU) to be charged, the charging power transmitting method may include: detecting temperature information and transmitting the information to the wireless power transmission unit; measuring a voltage by the wireless power received from the wireless power transmission unit; reducing a charging voltage to be transmitted from the wireless power transmission unit according to an increasement of the measure temperature and determining a voltage configuration value downwardly adjusted by a pre-configured level in comparison with the pre-configured voltage configuration value when the measured voltage is smaller than a minimum voltage value $V_{RECT\_MIN}$ or a difference between the measured voltage and the minimum voltage value is within a pre-configured range, and transmitting the determined voltage configuration value to the wireless power transmission.

The determined voltage configuration value may be included in a PRU dynamic signal and be transmitted.

The voltage configuration value may be at least one value among a minimum voltage value $V_{RECT\_MIN}$ of a rear end of a rectifier of the wireless power reception unit, an optimum voltage value $V_{RECT\_SET}$ of the rear end of the rectifier of the wireless power reception unit, and a maximum voltage value $V_{RECT\_HIGH}$ of the rear end of the rectifier of the wireless power reception unit.

In accordance with another aspect of the present disclosure, a charging power transmitting method of a wireless Power Transmission Unit (PTU) which allows a wireless Power Reception Unit (PRU) to be charged may include: determining a charging mode of the wireless power reception unit; determining a voltage configuration value downwardly adjusted by a pre-configured level in comparison with the predetermined voltage configuration value when a Continuous Current (CC) mode has been switched into a Continuous Voltage (CV) mode, and transmitting the determined voltage configuration value to the wireless power transmission unit.

The determined voltage configuration value may be included in a PRU dynamic signal and be transmitted.

The voltage configuration value may be at least one value among a minimum voltage value $V_{RECT\_MIN}$ of a rear end of a rectifier of the wireless power reception unit, an optimum voltage value $V_{RECT\_SET}$ of the rear end of the rectifier of the wireless power reception unit, and a maximum voltage value $V_{RECT\_HIGH}$ of the rear end of the rectifier of the wireless power reception unit.

In accordance with another aspect of the present disclosure, a charging power transmitting method of a wireless Power Transmission Unit (PTU) which allows a wireless Power Reception Unit (PRU) to be charged may include: determining a charging state of the wireless power reception unit; determining a voltage configuration value downwardly adjusted by a pre-configured level in comparison with the predetermined voltage configuration value when the charging has been completed as a result of the determination, and transmitting the determined voltage configuration value to the wireless power transmission unit.

The determined voltage configuration value may be included in a PRU dynamic signal and be transmitted.

The voltage configuration value may be at least one value among a minimum voltage value $V_{RECT\_MIN}$ of a rear end of a rectifier of the wireless power reception unit, an optimum voltage value $V_{RECT\_SET}$ of the rear end of the rectifier of the wireless power reception unit, and a maximum voltage value $V_{RECT\_HIGH}$ of the rear end of the rectifier of the wireless power reception unit.

In accordance with another aspect of the present disclosure, a charging power transmitting method of a wireless Power Transmission Unit (PTU) which allows a wireless Power Reception Unit (PRU) to be charged may include: receiving a static voltage configuration value from the wireless power reception unit; transmitting power for charging of the wireless power reception unit in reference to the received voltage configuration value; receiving a voltage configuration value adjusted from the wireless power reception unit; and transmitting power for charging of the wireless power reception unit in reference to the adjusted voltage configuration value.

The adjusted voltage configuration value may be received through a PRU dynamic signal transmitted from the wireless power reception unit.

In accordance with another aspect of the present disclosure, a wireless Power Reception Unit (PRU) for receiving wireless charging power from a wireless Power Transmission Unit (PTU) may include: a controller that measures the received charging power and when the measured power is smaller than a minimum power for charging initiation or a difference between the measured charging power and the minimum power is within a pre-configured range, determines a voltage configuration value upwardly adjusted by a pre-configured level over a pre-configured voltage configuration value; and a communication unit that transmits the determined voltage configuration value to the wireless power transmission unit.

The determined voltage configuration value may be included in a PRU dynamic signal and is transmitted.

The voltage configuration value may be at least one value among a minimum voltage value $V_{RECT\_MIN}$ of a rear end of a rectifier of the wireless power reception unit, an optimum voltage value $V_{RECT\_SET}$ of the rear end of the rectifier of the wireless power reception unit, and a maximum voltage value $V_{RECT\_HIGH}$ of the rear end of the rectifier of the wireless power reception unit.

The charging power may be measured at a rear end of the rectifier of the wireless power reception unit.

In accordance with another aspect of the present disclosure, a wireless Power Reception Unit (PRU) for receiving wireless charging power from a wireless Power Transmission Unit (PTU) may include: a controller that determines whether a charging voltage of the wireless power reception unit deviates from a pre-configured valid voltage range and when the charging voltage deviates from the valid voltage range, determines a voltage configuration value adjusted by a pre-configured level over a pre-configured voltage configuration value; and a communication unit that transmits the determined voltage configuration value to the wireless power transmission unit.

In accordance with another aspect of the present disclosure, a wireless Power Transmission Unit (PTU) for receiving wireless charging power from a wireless Power Reception Unit (PRU) may include a communication unit that receives a static voltage configuration value from the wireless power reception unit; and a power transmission unit that transmits a power for charging of the wireless power reception unit in reference to the received voltage configuration unit, wherein the communication unit receives an adjusted voltage configuration value from the wireless power reception unit and transmits the power for charging of the wireless power reception unit in reference to the adjusted voltage configuration value.

The adjusted voltage configuration value may receive a PRU dynamic signal transmitted from the wireless power reception unit.

Advantageous Effects of Invention

According to an embodiment of the present disclosure, a proper charging voltage configuration value is readjusted according to various charging situations of the wireless power reception unit so that a waste of unnecessary power can be reduced and an efficiency of a wireless charging can be increased.

Further, according to the embodiment of the present disclosure, it is possible to solve a problem in that a charging process is not effectively progressed by a voltage configuration value which is unsuitable to a charging situation when a wireless charging is progressed according to a pre-configured voltage configuration value by a static parameter.

BRIEF DESCRIPTION OF DRAWINGS

The above and other aspects, features, and advantages of the present disclosure will be more apparent from the following detailed description taken in conjunction with the accompanying drawings, in which:

FIG. 1 illustrates a concept describing general operations of a wireless charging system.

FIG. 2 is a block diagram illustrating a wireless power transmission unit and a wireless power reception unit according to an embodiment of the present disclosure.

FIG. 3 is a block diagram illustrating a detail of the wireless power transmission unit and the wireless power reception unit according to an embodiment of the present disclosure.

FIG. 4 is a flow diagram illustrating operations of the wireless power transmission unit and the wireless power reception unit according to an embodiment of the present disclosure.

FIG. 5 is a flowchart illustrating operations of the wireless power transmission unit and the wireless power reception unit according to another embodiment of the present disclosure.

FIG. 6 is a graph on a time axis of an amount of power applied by a wireless power transmission unit;

FIG. 7 is a flowchart illustrating a control method of the wireless power transmission unit according to an embodiment of the present disclosure.

FIG. 8 is a graph on a time axis of an amount of power applied by a wireless power transmission unit according to the embodiment of FIG. 7.

FIG. 9 is a flowchart for describing a control method of a wireless power transmission unit according to an embodiment of the present disclosure.

FIG. 10 is a graph on a time axis of an amount of power applied by a wireless power transmission unit according to the embodiment of FIG. 9.

FIG. 11 is a block diagram of a wireless power transmission unit and a wireless power reception unit according to an embodiment of the present disclosure.

FIG. 12 is a flowchart illustrating a charging voltage configuration change process in a wireless charging according to an embodiment of the present disclosure;

FIG. 13 is a flowchart illustrating a charging voltage configuration process during charging initiation according to a first embodiment of the present disclosure;

FIG. 14 is a flowchart illustrating a charging voltage configuration process during a multi-charging according to a second embodiment of the present disclosure;

FIGS. 15 to 17 are flowcharts illustrating a charging voltage configuration process when charging power is reduced according to a third embodiment of the present disclosure;

FIG. 18 is a flowchart illustrating a charging voltage configuration process when a charging mode changes according to a fourth embodiment of the present disclosure;

FIG. 19 illustrates a voltage level in which a charging voltage configuration is changed according to a second embodiment of the present disclosure;

FIG. 20 is a graph illustrating a state change according to a third embodiment of the present disclosure;

FIG. 21 illustrates a voltage level in which a charging voltage configuration is changed according to a third embodiment of the present disclosure;

FIG. 22 is a graph illustrating a state change according to a fourth embodiment of the present disclosure; and FIG. 23 illustrates a voltage level in which a charging voltage configuration is changed according to a fourth embodiment of the present disclosure.

MODE FOR THE INVENTION

Hereinafter, various embodiments of the present disclosure will be described more specifically with reference to the accompanying drawings. It should be noted that the same components of the drawings are designated by the same reference numeral anywhere. In the following description of the present disclosure, a detailed description of known functions and configurations incorporated herein will be omitted when it may make the subject matter of the present disclosure rather unclear.

In an embodiment of the present disclosure, a charging voltage configuration method is provided for determining a voltage configuration value suitable for a corresponding situation according to various charging situations of a wireless power reception unit so as to adjust the voltage configuration value to a voltage configuration value suitable for each situation and then provide a wireless charging.

According to a wireless charging standard, in a resonant type wireless charging, a Power Transmission Unit (PTU) has been communicates with a Power Receive Unit (PRU) and then the PRU and the PTU exchange own static parameters through a static signal so that own information on a state can be transmitted to a counterpart.

However, as described above, the static value (e.g., voltage configuration value) is a value configured with reference to a Continuous Current (CC) mode of a battery which is the most common state. When the static value is fixed and wireless charging is progressed, a state of the PRU cannot be reflected. For example, $V_{RECT}$ of a PRU static is configured based on when the load of the PRU requires the largest power in a single charging and the CC mode.

Therefore, in embodiments of the present disclosure, a voltage configuration value to which a state of the PRU is reflected according to each situation is transmitted from the PRU to the PTU so that the PTU can control more effectively a charging voltage to the PRU. When the voltage configuration value has been transmitted from the PRU to the PTU, the voltage configuration value can be transmitted by being included in a PRU dynamic signal.

Meanwhile, the voltage configuration value may be configured as various values according to embodiments of the present disclosure. For example, a minimum voltage value $V_{RECT\_MIN}$ of a rear end of a rectifier of the PRU, an optimum voltage value $V_{RECT\_SET}$ of the rear end of the rectifier of the PRU, and a maximum voltage value $V_{RECT\_HIGH}$ of the rear end of the rectifier of the PRU, or the like may be configured.

Therefore, the PTU adjusts a charging power transmitted to the PRU based on at least one configuration value among the various voltage configuration values. In this event, the optimum voltage value $V_{RECT\_SET}$ may be configured as a value between the minimum voltage value $V_{RECT\_MIN}$ and the maximum voltage value $V_{RECT\_HIGH}$.

In the charging process, the following situations, as examples of various situations in which the voltage configuration value should be adjusted, may occur and new voltage configuration values may be readjusted according to each situation.

For example, impedance of a front end of a load unit is larger than impedance of a load unit of the PRU when charging starts in the PRU. Therefore, more power is transmitted to the front end of the load unit in comparison with the load unit by a distribution of the power so that enough power cannot be supplied to the load unit. According to the embodiment of the present disclosure, the voltage configuration value is adjusted before and after the charging starts so as to enable charging initiation to be smoothly performed.

According to another embodiment, in a case in which multi-charging is being performed, when the PRUs, which are different from each other, are to be simultaneously charged, $V_{RECT}$ may be an interval which is more efficient than an initial set value (e.g., static voltage configuration value) and be dynamically changed by the PRU.

Further, according to another embodiment, when a temperature excessively increases or a current over flows during charging, or when a voltage is excessively high, $V_{RECT}$ value readjusted by the PTU is transmitted so that charging power can be adjusted.

According to another embodiment, when a charging mode is switched from the CC mode to a Continuous Voltage (CV) mode or the charge of PRU is completed in the CV mode, a transmission of much power is not needed. Therefore, according to the embodiment of the present disclosure, a voltage configuration value is dynamically adjusted so that charging power can be reduced.

Meanwhile, first, referring to FIGS. 1 to 11, a concept of a wireless charging system which can be applied to the embodiment of the present disclosure will be described and, hereinafter, referring to FIGS. 12 to 23, a charging voltage configuration method for a wireless charging according to the embodiment of the present disclosure will be described in detail.

FIG. 1 illustrates a concept describing general operations of a wireless charging system. As shown in FIG. 1, the wireless charging system includes a wireless power transmission unit 100 and one or more wireless power reception units 110-1, 110-2, . . . , and 110-$n$.

The wireless power transmission unit 100 may wirelessly transmit power 1-1, 1-2, . . . , and 1-$n$ to the one or more wireless power reception units 110-1, 110-2, . . . , and 110-$n$, respectively. Particularly, the wireless power transmission unit 100 may wirelessly transmit power 1-1, 1-2, . . . , and 1-$n$ to only a wireless power reception unit which is authenticated through a predetermined authentication procedure.

The wireless power transmission unit 100 may achieve an electrical connection with the wireless power reception units 110-1, 110-2, . . . , and 110-$n$. For example, the wireless power transmission unit 100 may transmit a wireless power in a form of electromagnetic waves to the wireless power reception units 110-1, 110-2, . . . , and 110-$n$.

Meanwhile, the wireless power transmission unit 100 may perform bidirectional communication with the wireless power reception units 110-1, 110-2, . . . , and 110-$n$. Herein, the wireless power transmission unit 100 and the wireless power reception units 110-1, 110-2, . . . , and 110-$n$ may process packets 2-1, 2-2, . . . , 2-$n$ configured as a predetermined frame or transmit and receive the packets. The frames will be described below in more detail. Particularly, the wireless power reception unit may be implemented with a mobile communication terminal, a PDA, a PMP, a smart phone or the like.

The wireless power transmission unit 100 may wirelessly provide power to a plurality of wireless power reception units 110-1, 110-2, . . . , and 110-$n$. For example, the wireless power transmission unit 100 may transmit power to the plurality of wireless power reception units 110-1, 110-2, . . . , and 110-$n$ through a resonant scheme. When the wireless power transmission unit 100 adopts the resonant scheme, it is preferable that a distance between the wireless power transmission unit 100 and the plurality of wireless power reception units 110-1, 110-2, . . . , and 110-$n$ is equal to or shorter than 30 m. Further, when the wireless power transmission unit 100 adopts the electromagnetic induction scheme, it is preferable that a distance between the wireless power transmission unit 100 and the plurality of wireless power reception units 110-1, 110-2, . . . , and 110-$n$ is equal to or shorter than 10 cm.

The one or more wireless power reception units 110-1, 110-2, . . . , and 110-$n$ may wirelessly receive power from the wireless power transmission unit 100 to charge batteries inside the wireless power reception units 110-1, 110-2, . . . , and 110-$n$. Further, the wireless power reception units 110-1, 110-2, . . . , and 110-$n$ may transmit a signal of requesting a wireless power transmission, information necessary for a reception of wireless power, information on a status of the wireless power reception units, or information on a control of the wireless power transmission unit 100 to the wireless power transmission unit 100. Information on the transmission signal will be described below in more detail.

Further, the wireless power reception units 110-1, 110-2, . . . , and 110-$n$ may transmit a message indicating a charging state of each of the wireless power reception units 110-1, 110-2, . . . , and 110-$n$ to the wireless power transmission unit 100.

The wireless power transmission unit 100 may include a display means such as a display and each state of the wireless power reception units 110-1, 110-2, . . . , and 110-$n$ may be displayed based on a received message from each of the wireless power reception units 110-1, 110-2, . . . , and 110-$n$. Further, the wireless power transmission unit 100 may also display a time expected to be spent until each of the wireless power reception units 110-1, 110-2, . . . , and 110-$n$ is completely charged.

The wireless power transmission unit 100 may transmit a control signal for making a wireless charging function disabled to each of the wireless power reception units 110-1, 110-2, . . . , and 110-$n$. The wireless power reception units having received the disable control signal of the wireless charging function from the wireless power transmission unit 100 may disable the wireless charging function.

FIG. 2 is a block diagram illustrating a wireless power transmission unit and a wireless power reception unit according to an embodiment of the present disclosure.

As illustrated in FIG. 2, the wireless power transmission unit 200 may include a power transmission unit 211, a controller 212 and a communication unit 213. Further, the wireless power reception unit 250 includes a power receiver 251, a controller 252 and a communication unit 253.

The power transmission unit 211 may supply power which is required by the wireless power transmission unit 200, and wirelessly provide power to the wireless power reception unit 250. Herein, the power transmission unit 211 provides the power in a form of alternating current waves, and also may supply power in a form of direct current waves. Furthermore, the power transmission unit 211 may convert the direct current waves into the alternating current waves by using an inverter so as to provide the power in the form of alternating current waves. The power transmission unit 211 may be implemented in a form of an embedded battery or in a form of a power receiving interface so as to receive the power from outside thereof and supply the power to the other components. It will be easily understood by those skilled in the art that the power transmission unit 211 is not limited as long as it can supply power of constant alternating current waves.

In addition, the power transmission unit 211 may supply the alternating current waves to the wireless power reception unit 250 in a form of electromagnetic waves. The power transmission unit 211 may further include a resonance circuit, resulting in a transmission or a reception of desired electromagnetic waves. When the power transmission unit 211 is implemented by the resonant circuit, inductance L of a loop coil of the resonant circuit may be changed. Meanwhile, it will be easily understood by those skilled in the art that the power transmission unit 211 is not limited if it can transmit and receive the electromagnetic waves.

The controller 212 may control overall operations of the wireless power transmission unit 200. The controller 212 may control an overall operation of the wireless power transmission unit 200 by using an algorithm, a program, or an application which is required for a control and read from a storage unit (not shown). The controller 212 may be implemented in a form of a Central Processing Unit (CPU), a microprocessor, or a mini computer. Operation of the controller 212 will be described below in detail.

The communication unit 213 may communicate with the wireless power reception unit 250 in a specific manner. The communication unit 213 is capable of communicating with a communication unit 253 of the wireless power reception unit 250 by using a Near Field Communication (NFC) scheme, a Zigbee communication scheme, an infrared ray communication scheme, a visible ray communication scheme, a Bluetooth communication scheme, a Bluetooth low energy scheme and the like. The communication unit 213 may use a CSMA/CA algorithm. On the other hand, the above mentioned communication schemes are merely exemplary, and the scope of the present disclosure is not limited by a specific communication scheme which is performed by the communication unit 213.

Meanwhile, the communication unit 213 may transmit a signal for information of the wireless power transmission unit 200. Herein, the communication unit 213 may unicast, multicast, or broadcast the signal.

Further, the communication unit 213 may receive power information from the wireless power reception unit 250. Herein, the power information may include at least one of a capacity of the wireless power reception unit 250, a residual amount of the battery, a number of times of charging, an amount of use, a battery capacity, and a proportion of the battery.

Further, the communication unit 213 may transmit a signal of controlling a charging function in order to control the charging function of the wireless power reception unit 250. The signal of controlling the charging function may be a control signal of controlling the wireless power receiver 251 of the specific wireless power reception unit 250 so as to make the charging function to be enabled or disabled. Further, in more detail, power information may include incoming information of a wired charging terminal, conversion information from a Stand Alone (SA) mode to a Non Stand Alone (NSA) mode, error situation release information, or the like.

The communication unit 213 may receive a signal from another wireless power transmission unit (not shown) as well as the wireless power reception unit 250. For example, the communication unit 213 may receive a notice signal from another wireless power transmission unit. For example, the communication unit 213 may receive a notice signal from another wireless power transmission unit.

Meanwhile, although it is illustrated that the power transmission unit 211 and the communication unit 213 are configured as different hardware so that the wireless power transmission unit 200 communicates in an out-band type in FIG. 3A, it is only an example. In the present disclosure, the power transmission unit 211 and the communication unit 213 may be implemented as one hardware and the wireless power transmission unit 200 may perform a communication with an in-band type.

The wireless power transmission unit 200 and the wireless power reception unit 250 may transmit and receive various signals. Accordingly, the wireless power reception unit 250 enters a wireless power network which is managed by the wireless power transmission unit 200 and performs a charging process through wireless power transmission and reception. The above mentioned process will be described below in more detail.

FIG. 3 is a block diagram illustrating a detail of the wireless power transmission unit and the wireless power reception unit according to the embodiment of the present disclosure.

As illustrated in FIG. 3, the wireless power transmission unit 200 may include the power transmission unit 211, the controller/communication unit 212/213, a driver 214, an amplifier 215, and a matching unit 216. The wireless power reception unit 250 may include a power receiver 251, a controller 252, a communication unit 253, a rectifier 254, a DC/DC converter 255, a switching unit 256 and a load unit 257.

The driver 214 may output DC power having a preset voltage value. The voltage value of the DC power output by the driver 214 may be controlled by the controller/communication unit 212/213.

The DC power output from the driver 214 may be output to the amplifier 215. The amplifier 215 may amplify the DC power by a preset gain. Further, the amplifying unit 215 may convert DC power to AC power based on a signal input from the controller 212 and the communication unit 213. Accordingly, the amplifier 215 may output AC power.

The matching unit 216 may perform impedance matching. For example, the matching unit 216 may adjust impedance and control the output power to have high efficiency or high capacity. The matching unit 216 may adjust impedance based on a control of the controller/communication unit 212/213. The matching unit 216 may include at least one of a coil and a capacitor. The controller/communication unit 212/213 may control a connection state with at least one of the coil and the capacitor, and accordingly, perform impedance matching.

The power transmission unit 211 may transmit input AC power to the power receiver 251. The power transmission unit 211 and the power reception unit 251 may be implemented with a resonance circuit having an identical resonance frequency. For example, the resonance frequency may be determined as 6.78 MHz.

Meanwhile, the controller/communication unit 212/213 may communicate with the controller/communication unit 252/253 of the wireless power reception unit 350, and perform communication (WiFi, ZigBee, or BT/BLE), for example, with a bi-directional 2.4 GHz frequency.

The power receiver 251 may receive charging power.

The rectifying unit 254 may rectify wireless power received by the power receiver 251 in the form of direct current, and is implemented in a form of bridge diode. The DC/DC converter 255 may convert the rectified electric current into a predetermined gain. For example, the DC/DC converter 255 may convert the rectified electric current so that a voltage of an output end 259 becomes 5V. Meanwhile, a minimum value and a maximum value of the voltage which can be applied may be preset for a front end 258 of the DC/DC converter 255.

The switch 256 connects the DC/DC converter 255 to the load unit 257. The switch unit 256 is held in an on/off state under a control of the controller 252. In a case where the switch 256 is in the on state, the load unit 257 stores converted power which is input from the DC/DC converter 255.

FIG. 4 is a flow diagram illustrating operations of the wireless power transmission unit and the wireless power reception unit according to an embodiment of the present disclosure. As shown in FIG. 4, a wireless power transmission unit 400 may apply power in step S401. When the power is applied, the wireless power transmission unit 400 may configure an environment in S402.

The wireless power transmission unit 400 may enter a power saving mode in step S403. In the power saving mode, the wireless power transmission unit 400 may respectively apply different detection power beacons to each period and this will be described in more detail in FIG. 6. For example, in FIG. 4, the wireless power transmission unit 400 may apply detection power beacons 404 and 405 and sizes of power values of the detection power beacons 404 and 405 may be different. A part or all of the detection power beacons 404 and 405 may have power enough to drive the communication unit of the wireless power reception unit 450. For example, the wireless power reception unit 450 may drive the communication unit by the part or all of the detection power beacons 404 and 405 to communicate with the wireless power transmission unit 400. The above state may be named a null state.

The wireless power transmission unit 400 may detect a load change by an arrangement of the wireless power reception unit 450. The wireless power transmission unit 400 may enter a low power mode in step S408. The low power mode will be described in more detail with reference to FIG. 6. Meanwhile, the wireless power reception unit 450 may drive the communication unit based on power received from the wireless power transmission unit 400 in step S409.

The wireless power reception unit 450 may transmit a wireless PTU searching signal to the wireless power transmission unit 400 in step S410. The wireless power reception unit 450 may transmit the wireless PTU searching signal by using a BLE based advertisement signal. The wireless power reception unit 450 may transmit the wireless PTU searching signal periodically or until a preset time arrives and may receive a response signal from the wireless power transmission unit 400.

When receiving the wireless PTU searching signal from the wireless power reception unit 450, the wireless power transmission unit 400 may transmit a PRU response signal in step S411. The PRU response signal may form a connection between the wireless power transmission unit 400 and the wireless power reception unit 450.

The wireless power reception unit 450 may transmit a PRU static signal in step S412. Herein, the PRU static signal may be a signal indicating a state of the wireless power reception unit 450.

Meanwhile, the PRU static signal may have a data structured such as <Table 1> below.

When the wireless power transmission unit 400 and the wireless power reception unit 450 transmit and receive the PRU static signal and the PTU static signal, the wireless power transmission unit 450 may transmit a PRU dynamic signal by periods in steps S414 and S415. The PRU dynamic signal may include information on at least one parameter measured by the wireless power reception unit 450. For example, the PRU dynamic signal may include information on a voltage at a rear end of the rectifier of the wireless power reception unit 450. The status of the wireless power reception unit 450 may be referred to as a boot status S427.

According to various embodiments of the present disclosure, a voltage configuration value, readjusted depending on each situation in the PRU dynamic signal, is included and transmitted so that an initially configured voltage configuration value can be readjusted to be suitable for a situation by the PRU static signal.

The wireless power transmission unit 400 may enter a power transmission mode in step S416, and the wireless power transmission unit 400 may transmit a PRU control signal which enables the wireless power reception unit 450 to perform the charging in step S417. In the power transmission mode, the wireless power transmission unit 400 may transmit charging power.

The PRU control signal transmitted by the wireless power transmission unit 400 may include information enabling/disabling the charging of the wireless power reception unit 450 and permission information. The PRU control signal may be transmitted when the wireless power transmission unit 400 intends to change the status of the wireless power reception unit 450, or may be transmitted by predetermined periods, e.g., periods of 250 ms. The wireless power reception unit 450 may change the setting according to the PRU control signal, and may transmit the PRU dynamic signal to report on the status of the wireless power reception unit 450 in steps S418 and S419. The PRU dynamic signal transmit-

TABLE 1

| Field | Octets | Description | Use | Units |
| --- | --- | --- | --- | --- |
| Optional fields validity | 1 | Defines which optional fields are populated | Mandatory | |
| PRU ID | 2 | ID of PRU | Mandatory | |
| PRU Category | 1 | Category of PRU | Mandatory | |
| PRU Information/Capabilities | 1 | Capabilities of PRU (bit field) | Mandatory | |
| Hardware rev | 1 | Revision of the PRU HW | Mandatory | |
| Firmware rev | 1 | Revision of the PRU SW | Mandatory | |
| maximum power desired | 1 | Maximum power desired by PRU | Mandatory | mW * 100 |
| $V_{RECT\_MIN\_STATIC}$ | 2 | $V_{RECT\_MIN}$ (static, first estimate) | Mandatory | mV |
| $V_{RECT\_HIGH\_STATIC}$ | 2 | $V_{RECT\_HIGH}$ (static, first estimate) | Mandatory | mV |
| $V_{RECT\_SET}$ | 2 | $V_{RECT\_SET}$ | Mandatory | mV |
| ΔR1 value | 2 | Delta R1 caused by PRU | Optional | .01 ohms (assume tabletop PTU) |
| $R_{RX\_IN}$ value | 2 | $R_{RX\_IN}$ value | Mandatory | Mohms |
| Rectifier impedx form | 1 | Rectifier impedance transformation | Mandatory | 0~5 (0~250) .02x resolution |
| Rectifier efficiency | 1 | Efficiency of rectifier | Mandatory | 0-100% (0-255) |

Therefore, the wireless power transmission unit 400 may transmit the PTU static signal including a data field such as the <Table 1> to the wireless power reception unit in step S413. The PTU static signal which the wireless power transmission unit 400 transmits may be a signal indicating a capability of the wireless power transmission unit 400.

ted by the wireless power reception unit 450 may include at least one of information on a voltage, a current, a status of the wireless power reception unit, and a temperature. In this event, the status of the wireless power reception unit 450 may be referred to as an On status.

Meanwhile, the PRU dynamic signal may have a data structure as indicated in <Table 2>.

TABLE 2

| Field | Octets | Description | Use | Units |
|---|---|---|---|---|
| Optional fields | 1 | Defines which optional fields are populated | Mandatory | |
| $V_{RECT}$ | 2 | Voltage at diode output | Mandatory | mV |
| $I_{RECT}$ | 2 | Current at diode output | Mandatory | mA |
| $V_{OUT}$ | 2 | Voltage at charge/battery port | Optional | mV |
| $I_{OUT}$ | 2 | Current at charge/battery port | Optional | mA |
| Temperature | 1 | Temperature of PRU | Optional | Deg C. from −40 C. |
| $V_{RECT\_MIN\_DYN}$ | 2 | VRECT_MIN_LIMIT (dynamic value) | Optional | mV |
| $V_{RECT\_SET\_DYN}$ | 2 | Desired VRECT (dynamic value) | Optional | mV |
| $V_{RECT\_HIGH\_DYN}$ | 2 | VRECT_HIGH_LIMIT (dynamic value) | Optional | mV |
| PRU alert | 1 | Warnings | Mandatory | Bit field |

The PRU dynamic signal may include at least one of optional field information, voltage information of the rear end of the rectifier of the wireless power reception unit, current information of the rear end of the rectifier of the wireless power reception unit, voltage information of the rear end of the DC/DC converter of the wireless power reception unit, current information of the rear end of the DC/DC converter of the wireless power reception unit, temperature information, minimum voltage value information $V_{RECT\_MIN\_DYN}$ of the rear end of the rectifier of the wireless power reception unit, optimal voltage value information $V_{RECT\_SET\_DYN}$ of the rear end of the rectifier of the wireless power reception unit, maximum voltage value information $V_{RECT\_HIGH\_DYN}$ of the rear end of the rectifier of the wireless power reception unit, and alert information (PRU alert), as indicated in <Table 2>.

For example, one or more voltage setting values (for example, the minimum voltage value information $V_{RECT\_MIN\_DYN}$ of the back end of the rectifier of the wireless power reception unit, the optimal voltage value information $V_{RECT\_SET\_DYN}$ of the back end of the rectifier of the wireless power reception unit, and the maximum voltage value information $V_{RECT\_HIGH\_DYN}$ of the back end of the rectifier of the wireless power reception determined according to each situation as described above may be inserted into corresponding fields of the PRU dynamic signal and then transmitted. The PTU which receives the PRU dynamic signal adjusts a wireless charging voltage to be transmitted to each PRU in reference to the voltage configuration values included in the PRU dynamic signal.

The alert information may be implemented as a data structure such as <Table 3> below.

reception unit 250. On the other hand, the PRU control signal may be transmitted whenever a charging state is changed. The PRU control signal may be transmitted, for example, every 250 ms, or transmitted when a parameter is changed. The PRU control signal may be configured to be transmitted within a preset threshold, for example, within one second even though the parameter is not changed.

Meanwhile, the wireless power reception unit 450 may detect generation of errors. The wireless power reception unit 450 may transmit an alert signal to the wireless power transmission unit 400 in step S420. The alert signal may be transmitted in the form of the PRU dynamic signal or a PRU alert signal. For example, the wireless power reception unit 450 may transmit a PRU alert field of Table 3 reflecting an error state to the wireless power transmission unit 400. Alternatively, the wireless power reception unit 450 may transmit a single alert signal, e.g., the PRU alert signal, indicating the error state to the wireless power transmission unit 400. When receiving the alert signal, the wireless power transmission unit 400 may enter a latch fault mode in step S422. The wireless power reception unit 450 may enter a null state in step S423.

FIG. 5 is a flowchart illustrating operations of the wireless power transmission unit and the wireless power reception unit according to another embodiment of the present disclosure. The process of FIG. 5 will be described in more detail with reference to FIG. 6. FIG. 6 is a graph on an x axis of an amount of power applied by a wireless power transmission unit according to the embodiment of FIG. 5.

As illustrated in FIG. 5, the wireless power transmission unit may initiate the operation in step S501. Further, the wireless power transmission unit may reset an initial con-

TABLE 3

| 7 | 6 | 5 | 4 | 3 | 2 | 1 | 0 |
|---|---|---|---|---|---|---|---|
| over voltage | over current | over temperature | charge complete | TA detect | transition | restart request | RFU |

The alert information may include an overvoltage, an overcurrent, an over temperature, charge complete, TA detection, SA mode/NSA mode transition, restart request and the like, as indicated in Table 3.

The wireless power reception unit 450 may receive the PRU control signal to perform the charging. For example, the wireless power transmission unit 400 may transmit the PRU control signal to enable the wireless power reception unit 450 to be charged when the wireless power transmission unit 200 has sufficient power to charge the wireless power figuration in step S503. The wireless power transmission unit may enter a power saving mode in step S505. The power saving mode may be an interval where the wireless power transmission unit applies power having different amounts to the power transmission unit. For example, the wireless power transmission unit may be an interval where second detection power 601 and 602 and third detection power 611, 612, 613, 614, and 615 of FIG. 6 are applied to the power transmission unit. The wireless power transmission unit may periodically apply the second detection power 601 and 602 by a second period. When the wireless power transmission unit applies the second detection power 601 and 602, the second detection power 601 and 602 may be continuously applied for a second term. The wireless power transmission unit may periodically apply the third detection power 611, 612, 613, 614, and 615 by a third period. When the wireless power transmission unit applies the third detection power 611, 612, 613, 614, and 615, the third detection power 611, 612, 613, 614, and 615 may be continuously applied for a third term. Meanwhile, even though it has been described that power values of the third detection power 611, 612, 613, 614, and 615 are respectively different, each power value of the third detection power 611, 612, 613, 614, and 615 may be different or identical.

The wireless power transmission unit may output the third detection power 611 and then output the third detection power 612 having the same amount of power as the third detection power 612. As described above, when the wireless power transmission unit outputs the third detection power having the same size, the power amount of the third detection power may have a power amount by which a smallest wireless power reception unit, for example, a wireless power reception unit of category 1 can be detected.

Meanwhile, the wireless power transmission unit may output the third detection power 611 and then output the third detection power 612 having a different amount of the power from the third detection power 611. When the wireless power transmission unit outputs the third detection power having the different amount as described above, the amount of the third power may be a sufficient amount to be detected a wireless power reception unit of categories 1 to 5. For example, when the third detection power 611 may have a power amount by which a wireless power reception unit of category 5 can be detected, the third detection power 612 may have a power amount by which a wireless power reception unit of category 3 can be detected, and the third detection power 613 may have a power amount by which a wireless power reception unit of category 1 can be detected.

Meanwhile, the second detection power 601 and 602 may be power which can drive the wireless power reception unit. More specifically, the second detection power 601 and 602 may have a power amount which can drive the controller and the communication unit of the wireless power reception unit.

The wireless power transmission unit may periodically apply the second detection power 601 and 602 and the third detection power 611, 612, 613, 614, and 615 to the power receiver by the second period and the third period. When the wireless power reception unit is disposed on the wireless power transmission unit, impedance at a point of the wireless power transmission unit may be changed. The wireless power transmission unit may detect an impedance change while second detection power 601 and 602 and third detection power 611, 612, 613, 614, and 615 of FIG. 6 are being applied. For example, the wireless power transmission unit may detect the impedance change while the third detection power 615 is applied. Accordingly, the wireless power transmission unit may detect an object in step S507. When the object is not detected in step S507-N, the wireless power transmission unit may maintain a power saving mode in which different power is periodically applied in step S505.

Meanwhile, when there is the change in the impedance and thus the object is detected in step S507-Y, the wireless power transmission unit may enter a low power mode. Herein, the low power mode is a mode where the wireless power transmission unit applies a driving power having a power amount by which the controller and the communication unit of the wireless power reception unit are operated.

For example, in FIG. 6, the wireless power transmission unit may apply driving power 620 to the power transmission unit. The wireless power reception unit may receive the driving power 620 to drive the controller and the communication unit. The wireless power reception unit may perform communication with the wireless power transmission unit according to a predetermined scheme based on the driving power 620. For example, the wireless power reception unit may transmit/receive data required for an authentication and join the wireless power network managed by the wireless power transmission unit based on the data. However, when a rogue object is arranged instead of the wireless power reception unit, the data transmission/reception cannot be performed. Accordingly, the wireless power transmission unit may determine whether the arranged object is the rogue object in step S511. For example, when the wireless power transmission unit does not receive a response from the object within a preset time, the wireless power transmission unit may determine the object as the rogue object.

If it is determined that the object is the rogue object in step S511-y, the wireless power transmission unit may enter the latch fault mode in step S513. If it is determined that the object is not the rogue object in step S511-N, however, an entering step may be performed in step S519. For example, the wireless power transmission unit may periodically apply a first power 631 to 634 of FIG. 6 by a first period. The wireless power transmission unit may detect a change in impedance while applying the first power. For example, when the rogue object has been withdrawn in step S515-Y, the change in the impedance may be detected and the wireless power transmission unit may determine that the rogue object is withdrawn. Alternatively, when the rogue object has been not withdrawn in step S515-N, the wireless power transmission unit may not detect the change in the impedance and may determine that the rogue object is not withdrawn. When the rogue object has been not withdrawn, the wireless power transmission unit may output at least one of a lamp and a warning sound to inform a user that a state of the wireless power transmission unit is an error state. Accordingly, the wireless power transmission unit may include an output unit that outputs at least one of the lamp and the warning sound.

When it is determined that the rogue object is not withdrawn in step S515-N, the wireless power transmission unit may maintain the latch fault mode in step S513. When it is determined that the rogue object is withdrawn in step S515-Y, on the other hand, the wireless power transmission unit may enter the power saving mode again in step S517. For example, the wireless power transmission unit may apply second power 651 and 652 and third power 661 to 665 of FIG. 5.

As described above, when the rogue object is arranged instead of the wireless power reception unit, the wireless power transmission unit may enter the latch fault mode. In addition, the wireless power transmission unit may determine whether the rogue object is withdrawn, according to the change in the impedance based on the power applied in the latch fault mode. That is, a condition of the entrance into the latch fault mode in the embodiment of FIGS. 5 and 6 may be the arrangement of the rogue object. Meanwhile, the wireless power transmission unit may have various latch fault mode entrance conditions other than the arrangement of the rogue object. For example, the wireless power transmission unit may be cross-connected with the arranged wireless power reception unit and may enter the latch fault mode in the above case.

Accordingly, when the cross-connection is generated, the wireless power transmission unit is required to return to an initial state and the wireless power reception unit is required to be withdrawn. The wireless power transmission unit may configure the cross-connection, in which the wireless power reception unit arranged on another wireless power transmission unit enters the wireless power network, as a condition of entry into the latch fault mode. An operation of the wireless power transmission unit when the error is generated which includes the cross-connection will be described with reference to FIG. 7.

FIG. 7 is a flowchart illustrating a control method of the wireless power transmission unit according to an embodiment of the present disclosure. The process of FIG. 7 will be described in more detail with reference to FIG. 8. FIG. 8 is a graph on a time axis of an amount of power applied by a wireless power transmission unit according to the embodiment of FIG. 7.

The wireless power transmission unit may initiate the operation in step S701. Further, the wireless power transmission unit may reset an initial configuration in step S703. The wireless power transmission unit may enter the power saving mode again in step S705. The power saving mode may be an interval where the wireless power transmission unit applies power having different amounts to the power transmission unit. For example, the wireless power transmission unit may be an interval where second detection power 801 and 802 and third detection power 811, 812, 813, 814, and 815 of FIG. 8 are applied to the power transmission unit. The wireless power transmission unit may periodically apply the second detection power 801 and 802 by a second period. When the wireless power transmission unit applies the second power 801 and 802, the second power detection 801 and 802 may be continuously applied for a second term. The wireless power transmission unit may periodically apply the third detection power 811, 812, 813, 814, and 815 by a third period. When the wireless power transmission unit applies the third detection power 811, 812, 813, 814, and 815, the third detection power 611, 612, 613, 614, and 615 may be continuously applied for a third term. Meanwhile, even though it has been described that power values of the third detection power 811, 812, 813, 814, and 815 is respectively different, each power value of the third detection power 811, 812, 813, 814, and 815 may be different or identical.

Meanwhile, the second detection power 801 and 802 may be power which can drive the wireless power reception unit. More specifically, the second detection power 801 and 802 may have a power amount which can drive the controller and the communication unit of the wireless power reception unit.

The wireless power transmission unit may periodically apply the second detection power 801 and 802 and the third detection power 811, 812, 813, 814, and 815 to the power receiver by second period and third period. When the wireless power reception unit is disposed on the wireless power transmission unit, impedance at a point of the wireless power transmission unit may be changed. The wireless power transmission unit may detect an impedance change while second detection power 801 and 802 and third detection power 811, 812, 813, 814, and 815 of FIG. 6 are being applied to. For example, the wireless power transmission unit may detect the impedance change while the third detection power 815 is applied. Accordingly, the wireless power transmission unit may detect an object in step S707. When the object is not detected in step S707-N, the wireless power transmission unit may maintain the power saving mode in which different power is periodically applied in step S705.

Meanwhile, when the impedance is changed and thus the object is detected in step S707-Y, the wireless power transmission unit may enter the low power mode in step S709. Herein, the low power mode is a mode where the wireless power transmission unit applies a driving power having a power amount by which the controller and the communication unit of the wireless power reception unit are operated. For example, in FIG. 8, the wireless power transmission unit may apply driving power 820 to the power transmission unit. The wireless power reception unit may receive the driving power 820 to drive the controller and the communication unit. The wireless power reception unit may perform communication with the wireless power transmission unit according to a predetermined scheme based on the driving power 820. For example, the wireless power reception unit may transmit/receive data required for an authentication and join the wireless power network managed by the wireless power transmission unit based on the data.

Thereafter, the wireless power transmission unit may enter the power transmission mode in which charging power is transmitted in step S711. For example, the wireless power transmission unit may apply charging power 821 and the charging power may be transmitted to the wireless power receiver as shown in FIG. 8.

The wireless power transmission unit may determine whether an error is generated in the power transmission mode. Herein, the error may be that a rogue object is arranged on the wireless power transmission unit, a cross-connection, an over voltage, an over current, an over temperature, or the like. The wireless power transmission unit may include a sensing unit that may measure the over voltage, the over current, over temperature and the like. For example, the wireless power transmission unit may measure a voltage or a current at a reference position. When the measured voltage or current is larger than a threshold, it is determined that conditions of the over voltage or the over current are satisfied. Alternatively, the wireless power transmission unit may include a temperature sensing means and the temperature sensing means may measure a temperature at a reference position of the wireless power transmission unit. When the temperature at the reference position is larger than a threshold, the wireless power transmission unit may determine that a condition of the over temperature is satisfied.

Meanwhile, when an over voltage, over current, or over temperature state is determined according to a measurement value of the temperature, voltage, or current, the wireless power transmission unit prevents the over voltage, over current, or over temperature by reducing the wireless charging power by a preset value. In this event, when a voltage value of a reduced wireless charging power is lower than a configured minimum value (e.g., a minimum voltage value $V_{RECT\_MIN\_DYN}$ of a rear end of the rectifier of the wireless power reception unit), a wireless charging stops so that a voltage configuration value can be readjusted according to the embodiment of the present disclosure.

Although it has been illustrated that the error is generated since the rogue object is additionally arranged on the wireless power transmission unit in the embodiment of FIG. 8, the error is not limited thereto and it will be easily understood by those skilled in the art that the wireless power transmission unit operates through a similar process with respect to the arrangement of the rogue object, the cross-connection, the over voltage, the over current, and the over temperature.

When the error has been not generated in step S713-N, the wireless power transmission unit may maintain the power transmission mode in step S711. Meanwhile, when the error has been generated in step S713-Y, the wireless power transmission unit may enter the latch fault mode in step S715. For example, the wireless power transmission unit may apply first power 831 to 835 as illustrated in FIG. 8. Further, the wireless power transmission unit may output an error generation display including at least one of a lamp and a warning sound during the latch fault mode. When it is determined that the rogue object has been not withdrawn in step S717-N, the wireless power transmission unit may maintain the latch fault mode in step S715. Meanwhile, when it is determined that the rogue object has been withdrawn in step S717-Y, the wireless power transmission unit may enter the power saving mode again in step S719. For example, the wireless power transmission unit may apply the second power 851 and 852 and the third power 861 to 865 of FIG. 8.

In the above description, the operation in a case where the error is generated while the wireless power transmission unit transmits the charging power has been discussed. Hereinafter, an operation of the wireless power transmission unit when a plurality of wireless power reception units receive charging power from the wireless power transmission unit will be described.

FIG. 9 is a flowchart for describing a control method of a wireless power transmission unit according to an embodiment of the present disclosure. The process of FIG. 9 will be described in more detail with reference to FIG. 10. FIG. 10 is a graph on a time axis of an amount of power applied by a wireless power transmission unit according to the embodiment of FIG. 9.

As illustrated in FIG. 9, the wireless power transmission unit may transmit charging power to a first wireless power reception unit in step S901. Further, the wireless power transmission unit may allow a second wireless power reception unit to join the wireless power network in step S903. The wireless power transmission unit may transmit charging power to the second wireless power reception unit in step S905. More specifically, the wireless power transmission unit may apply a sum of the charging power required by the first wireless power reception unit and the second wireless power reception unit to the power receiver.

FIG. 10 illustrates an embodiment of steps S901 to S905. For example, the wireless power transmission unit may maintain the power saving mode in which second detection power 1001 and 1002 and third detection power 1011 to 1015 are applied. Thereafter, the wireless power transmission unit may detect the first wireless power reception unit and enter the low power mode in which the detection power 1020 is maintained. Next, the wireless power transmission unit may enter the power transmission mode in which first charging power 1030 is applied. The wireless power transmission unit may detect the second wireless power reception unit and allow the second wireless power reception unit to join the wireless power network. Further, the wireless power transmission unit may apply second charging power 1040 having a power amount corresponding to a sum of power amounts required by the first wireless power reception unit and the second wireless power reception unit.

Referring back to FIG. 9, the wireless power transmission unit may detect error generation in step S907 while charging power is transmitted to both the first and second wireless power reception units in step S905. Herein, the error may be a rogue object arrangement, a cross-connection, an over voltage, an over current, an over temperature, or the like. When the error has been not generated in step S907-N, the wireless power transmission unit may maintain the applying of the second charging power 1040.

Meanwhile, when the error has been generated in step S907-Y, the wireless power transmission unit may enter the latch fault mode in step S909. For example, the wireless power transmission unit may apply the first power 1051, 1052, 1053, 1054, and 1055 of FIG. 10 by a first period. The wireless power transmission unit may determine whether both the first wireless power reception unit and the second wireless power reception unit are withdrawn in step S911. For example, the wireless power transmission unit may detect an impedance change while applying the first power 1051 to 1055. The wireless power transmission unit may determine whether both the first wireless power reception unit and the second wireless power reception unit are withdrawn based on whether the impedance is returned to an initial value.

When it is determined that both the first wireless power reception unit and the second wireless power reception unit are withdrawn in step S911-Y, the wireless power transmission unit may enter the power saving mode in step S913. For example, the wireless power transmission unit may apply second detection power 1061 and 1062 and third detection power 1071 to 1075 according to a second period and a third period, respectively, as shown in FIG. 10.

As described above, even if the wireless power transmission unit applies charging power to a plurality of wireless power reception units, the wireless power transmission unit may determine whether the wireless power reception unit or the rogue object is easily withdrawn when the error occurs.

FIG. 11 is a block diagram of a wireless power transmission unit and a wireless power reception unit according to an embodiment of the present disclosure.

A wireless power transmission unit 1100 may include a communication unit 1110, a Power Amplifier (PA) 1120, and a resonator 1130. The wireless power reception unit 1150 may include a communication unit 1151, an Application Processor (AP) 1152, a Power Management Integrated Circuit (PMIC) 1153, a Wireless Power Integrated Circuit (WPIC) 1154, a resonator 1155, an Interface Power Management (IFPM) IC 1157, a Travel Adapter (TA) 1158, and a battery 1159.

The communication unit 1110 may communicate with the communication unit 1151 based on a predetermined scheme, e.g., a BLE scheme. The communication unit 1151 of the wireless power transmission unit 1150 may transmit the PRU dynamic signal having the data configuration of Table 2 to the communication unit 1110 of the wireless power transmission unit 1100. As described above, the PRU dynamic signal may include at least one information of voltage information, current information, temperature information and alert information of the wireless power reception unit 1150.

A value of the power output from the power amplifier 1120 may be adjusted based on the received PRU dynamic signal. For example, when the over-voltage, the overcurrent, and the over-temperature are applied to the wireless power reception unit 1150, a power value output from the power amplifier 1120 may be reduced. Further, when a voltage or current of the wireless power reception unit 1150 is smaller than a preset value, a power value output from the power amplifier 1120 may be increased.

Charging power from the resonator 1130 may be wirelessly transmitted to the resonator 1155.

The WPIC 1154 may rectify the charging power received from the resonator 1155 and perform DC/DC conversion. The WPIC 1154 uses the converted power to operate the communication unit 1151 or to charge the battery 1159.

Meanwhile, a wired charging terminal may be inserted into the travel adapter 1158. The travel adapter 1158 may have the wired charging terminal such as a 30 pin connector or USB connector which is inserted in the travel adapter 1158, and may receive the power supplied from an external power source to charge the battery 1159.

The IFPM 1157 may process power applied from the wired charging terminal and output the processed power to the battery 1159 and the PMIC 1153.

The PMIC 1153 may manage wirelessly received power, power received through a wire, and power applied to each of the components of the wireless power reception unit 1150. The AP 1152 may receive information on the power from the PMIC 1153, and may control the communication unit 1151 to transmit the PRU dynamic signal of reporting the power information.

Meanwhile, the travel adapter 1158 may be connected to a node 1156 connected to the WPIC 1154. When the wired charging connector is inserted into the travel adapter 1158, a predetermined voltage, e.g., a voltage of 5 V, may be applied to the node 1156. The WPIC 1154 may monitor the voltage applied to the node 1156 to determine whether the travel adapter is inserted.

A concept of the wireless charging system which can be applied to the embodiment of the present disclosure has been described with reference to FIGS. 1 to 11. Hereinafter, referring to FIGS. 12 to 23, a charging voltage configuration method for wireless charging according to an embodiment of the present disclosure will be described in detail.

FIG. 12 is a flowchart illustrating a charging voltage configuration change process in wireless charging according to an embodiment of the present disclosure. Referring to FIG. 12, as described above, a voltage configuration value is transmitted to a PTU through a PRU static signal in step S1201. For example, as initiated in a wireless charging standard, the PRU static signal in Table 1 includes and transmits an initial voltage configuration value such as $V_{RECT\_MIN\_STATIC}$, $V_{RECT\_HIGH\_STATIC}$, $V_{RECT\_SET}$ or the like so as to cause the PTU to transmit wireless charging power to the PRU according to the voltage configuration value.

Meanwhile, when wireless charging of a corresponding PRU is permitted in the PTU according to a communication with the PTU and the PRU in step S1202, the PTU transmits wireless charging power to the PRU according to the initial voltage configuration value. When voltage configuration change conditions are occurred in various wireless charging situations according to various embodiments of the present disclosure in step S1204, the voltage configuration value is readjusted according to the embodiment of the present disclosure.

For example, the voltage configuration value is determined according to each condition of various embodiments below in step S1205, and a PRU dynamic signal including the determined voltage configuration value is generated in step S1206. Then, the generated PRU dynamic signal is transmitted to the PTU in step S1207.

The PTU transmits wireless charging power in reference to a new voltage configuration value included in a dynamic signal transmitted from the PRU. Therefore, the wireless charging power may be transmitted by being adjusted according to various situations.

Hereinafter, in reference to FIGS. 13 to 23, a charging voltage configuration process according to various embodiments of the present disclosure will be described. First, referring to FIG. 13, a method (an example of wireless charging initiation time point) according to a first embodiment of the present disclosure will be described and then referring to FIGS. 14 and 19, a method (an example of a multi-charging situation) according to a second embodiment of the present disclosure will be described. Then, referring to FIGS. 15, 20, and 21, a method (examples of the over temperature, the over voltage, and the over current) according to a third embodiment of the present disclosure will be described and then referring to FIGS. 18, 22, and 23, a method (an example of a charging mode switching) according to a fourth embodiment of the present disclosure will be described.

FIG. 13 is a flowchart illustrating a charging voltage configuration process during charging initiation according to a first embodiment of the present disclosure. Referring to FIG. 13, the PRU receives a PRU control signal from the PTU in step S1301. For example, when wireless charging permission information for the PTU is included the PRU control signal, wireless charging is initiated. That is, when the wireless charging for the PRU has been permitted from the PTU in step S1302, the PTU transmits charging power according to a voltage configuration value included in the PRU static signal to the PRU. The PRU receives charging power from the PTU in step S1303.

When charging is performed according to the voltage configuration value included in the PRU static signal at a time point of the charging initiation, a case in which charging is not normally started may occur. This will be described in detail below.

In a circuit of FIG. 3, at a time point of the charging initiation, a resistance value of the load unit 257 may become smaller than a resistance value of a wireless charging circuit unit (e.g., the rectifier 254, a DC/DC converter 255, a switching unit 256, or the like). In this event, even though power transmitted to the resonator (e.g., the power receiver 251 in FIG. 3) increases, a phenomenon in which actual power transmitted to the load unit 257 decreases may be generated.

For example, when power required for charging initiation is 10 W, unless the power is made to increase and then transmitted, a phenomenon in which charging does not start may be generated as Table 4.

TABLE 4

| power transmitted to resonator | wireless charging circuit | | load unit | |
|---|---|---|---|---|
| | resistance value (Ohm) | power to be transmitted | resistance value | power to be transmitted |
| 20 W | 10 | 10 W | 10 | 10 W |
| 24 W | 10 | 16 W | 5 | 8 W |
| 30 W | 10 | 20 W | 5 | 10 W |

Referring to <Table 4>, in a case in which power to be transmitted to the resonator is 24 W according to wireless power transmitted by a voltage configuration value configured in an initial static signal, when a resistance value of the wireless charging circuit is 10Ω and a resistance value of the load unit is 5Ω, power to be transmitted to the wireless charging circuit is 16 W and power to be transmitted to the load unit is 8 W according to a power distribution.

When the power required for charging initiation is 10 W, charging is not made to start in the state. Therefore, according to the embodiment of the present disclosure, power is previously measured in the PRU before the charging starts and then when the measured power does not satisfy a charging starting condition, at least one voltage configuration value $V_{RECT}$ is adjusted so as to allow the charging to smoothly start. For example, according to the embodiment of the present disclosure, the voltage configuration value should be adjusted to allow power to be transmitted to the resonator to be 30 W.

That is, when the PRU receives the charging power from the PTU in step S1303, the received power is measured in step S1304 and then is compared with a pre-configured power value (e.g., a minimum power level $P_{start}$ for the charging initiation). In this event, a voltage value by the received power may be measured and be compared with a pre-configured voltage value. Therefore, as a result of the comparison, when the voltage for the received power is smaller than the pre-configured voltage value in step S1305, at least one among voltage configuration values (e.g., a minimum voltage value $V_{RECT\_MIN}$ of a rear end of a rectifier of the wireless power reception unit, an optimum voltage value $V_{RECT\_SET}$ of the rear end of the rectifier of the wireless power reception unit, a maximum voltage value $V_{RECT\_HIGH}$ of the rear end of the rectifier of the wireless power reception unit, or the like) is determined as a value which is upwardly adjusted by a pre-configured level in step S1306.

Then, a PRU dynamic signal including the determined voltage configuration value is generated in step S1307, the generated PRU dynamic signal is transmitted to the PTU in step S1308. In this event, only the upwardly adjusted minimum voltage value $V_{RECT\_MIN}$ is transmitted as the voltage configuration value so that power can increase and the optimum voltage value $V_{RECT\_SET}$ can be transmitted.

The PTU receives the PRU dynamic signal from the PRU and transmits wireless power in reference to an upwardly adjusted voltage configuration value included in the PRU dynamic signal. As described above, the PRU receives wireless power upwardly adjusted according to the upwardly adjusted voltage configuration value so that the wireless charging can smoothly start.

Meanwhile, in step S1305 of FIG. 13, it has been described that the voltage configuration value is upwardly adjusted when received power is smaller than a minimum power level for the pre-configured charging initiation, but the present disclosure is not limited thereto. For example, even though the measured received power is larger than the minimum power level, the voltage configuration value may be upwardly adjusted when the measured received power reaches to near the minimum power level. Therefore, when received charging power is smaller than the minimum power level $P_{start}$ for the charging initiation or a difference between the two values (the received charging power and the pre-configured minimum power level for the charging initiation) is within a pre-configured range, the voltage configured value may be implemented to be upwardly adjusted.

Further, according to another embodiment of the present disclosure, the adjusted voltage configuration value may be determined as a pre-configured value for each PTU or a pre-configured value through an experiment. Further, during the charging initiation, the determined voltage configuration values are transmitted to a PRU dynamic signal transmitted before or after a PRU control message is transmitted so that a power level to be transmitted from the PTU may be adjusted. Specific embodiments of a method of adjusting the voltage configuration value will be described below.

FIG. 14 is a flowchart illustrating a charging voltage configuration process during multi-charging according to a second embodiment of the present disclosure. Since voltage configuration values previously configured by the PRU static signal are configured with reference to single charging (e.g., one PTU charges one PRU), voltage configuration values may not have an optimum efficiency at a time of multi-device charging (e.g., one or more PTUs charge the plurality of the PRUs) which makes a plurality of the PRUs charge.

For example, when one PTU is to simultaneously charge a first PRU (PRU 1) and a second PRU (PRU 2) as shown in FIG. 19, according to a voltage configuration value (e.g., $V_{RECT\_SET}$) configured by the PRU static signal, the first PRU can normally charge but the second PRU is charged with a low voltage. FIG. 19 illustrates a voltage level in which a charging voltage configuration is changed according to a second embodiment of the present disclosure.

That is, a voltage configuration value configured by the PRU static signal is a value configured with reference to the single charging so that the voltage configuration value configured by the PRU static signal may not be a configuration value having optimal efficiency.

Therefore, when a value of an actual measured $V_{RECT}$ is small so that efficiency is reduced, the second PRU may request an upward adjustment of $V_{RECT\_MIN}$ to the PTU through the PRU dynamic signal. That is, a value of $V_{RECT\_SET}$ is upwardly adjusted or $V_{RECT\_MIN}$ is upwardly adjusted through the PRU dynamic parameter (e.g., $V_{RECT\_SET\_DYN}$, $V_{RECT\_MIN\_DYN}$, $V_{RECT\_HIGH\_DYN}$) so that an increase of power to be transmitted from the PTU may be requested.

Therefore, power to be transmitted to the PRUs increases so that $V_{RECT}$ of the first PRU and the second PRU may be upwardly adjusted as shown in FIG. 19. Accordingly, wireless charging efficiency of the second PRU may be improved. Further, according to another embodiment of the present disclosure, on the contrary, an efficiency improvement may be induced through a downwardly adjustment of the value of $V_{RECT}$.

Returning to FIG. 14, when wireless charging is initiated in step S1401 and in multi-charging S1402 situation, it is determined whether measured $V_{RECT}$ of at least one PRU deviates from a valid voltage range (optimum range) in step S1403. For example, in FIG. 19, measured $V_{RECT}$ of the second PRU is close to $V_{RECT\_MIN}$ so that it may be determined that the measured $V_{RECT}$ has deviated from the valid voltage range. Meanwhile, conditions required to deviate from the valid voltage range may be variously configured.

Therefore, when at least one PRU which deviates from the valid voltage range exists, an adjusted voltage configuration value is determined in step S1405. For example, when $V_{RECT}$ measured in at least one PRU is close to $V_{RECT\_MIN}$ or smaller than $V_{RECT\_MIN}$, a voltage configuration value (e.g., $V_{RECT\_SET}$) is upwardly adjusted and transmitted so as to enable wireless power charging efficiency of a corresponding PRU to increase or enable the normal wireless charging to be progressed. According to another embodiment of the present disclosure, when $V_{RECT}$ measured in at least one PRU is close to $V_{RECT\_HIGH}$ or larger than $V_{RECT\_HIGH}$ in at least one PRU, a voltage configuration value (e.g., $V_{RECT\_SET}$) is downwardly adjusted and transmitted so as to enable wireless power charging efficiency of a corresponding PRU to increase or enable normal wireless charging to be progressed.

Then, as shown in FIG. 13, a PRU dynamic signal including the determined voltage configuration value is generated in step S1406, the generated PRU dynamic signal is transmitted to the PTU in step S1407. In this event, only the upward adjusted minimum voltage value $V_{RECT\_MIN}$ is transmitted as the voltage configuration value so that power can increase and the upwardly adjusted optimum voltage value $V_{RECT\_SET}$ can be transmitted.

FIGS. 15 to 17 are flowcharts illustrating a charging voltage configuration process when charging power is reduced according to a third embodiment of the present disclosure. FIG. 15 illustrates a charging voltage configuration process when charging power is reduced by an over temperature, FIG. 16 illustrates a charging voltage configuration process when charging power is reduced by an over current, and FIG. 17 illustrates a charging voltage configuration process when charging power is reduced by an over voltage.

FIG. 20 is a graph illustrating a state change according to a third embodiment of the present disclosure and FIG. 21 illustrates a voltage level in which a charging voltage configuration is changed according to a third embodiment of the present disclosure.

First, referring to FIG. 20, a temperature, a current, or a voltage of the PRU may increase as a voltage configuration value $V_{RECT}$ (e.g., $V_{RECT\_SET}$, $V_{RECT\_MIN}$, and $V_{RECT\_HIGH}$) previously configured by a static parameter during charging (PRU state 1). In this event, according to a pre-configured process, the PTU may reduce a level of wireless transmission power in order to prevent a device damage by the over temperature, the over current, and the over voltage.

However, when a temperature, a current, or a voltage continuously increase even though power to be transmitted from the PTU has been reduced, the PRU may be continuously downwardly adjusted by adding a $V_{RECT}$ value according to the pre-configured method and $V_{RECT}$ measured in the PRU may be close to a pre-configured $V_{RECT\_MIN}$ or be lower than $V_{RECT\_MIN}$ (state 2).

According to the third embodiment of the present disclosure, when a value of actual measured $V_{RECT}$ is small so that efficiency is reduced, the PRU may request a downwardly adjustment of $V_{RECT\_MIN}$ to the PTU through the PRU dynamic signal. That is, even though power to be transmitted from the PTU is transmitted to be lowered by the over temperature, the over current, the over voltage, or the like by downwardly adjusting $V_{RECT\_MIN}$ through the PRU dynamic parameter (e.g., $V_{RECT\_SET\_DYN}$, $V_{RECT\_MIN\_DYN}$, $V_{RECT\_HIGH\_DYN}$), a configuration value of $V_{RECT\_MIN}$ is made to be even lower so that a problem in that a power transmission stops because of the configuration value of $V_{RECT\_MIN}$ can be solved.

Meanwhile, when a temperature, a current, or a voltage continuously increase even though the configuration value of $V_{RECT\_MIN}$ has been reduced, the configuration value of $V_{RECT\_MIN}$ can be continuously lowered. However, when measured $V_{RECT}$ is continuously lowered until power cannot to be charged, charging cannot be maintained. Therefore, the configuration value of the $V_{RECT\_MIN}$ may be implemented to be lowered as only a level of a degree capable of maintaining charging.

Referring to FIG. 15, wireless charging is initiated in step S1501 and a temperature of a PRU is measured in step S1502. The measured value is transmitted to the PTU (e.g., transmitted through the PRU dynamic signal). In the PTU, when a temperature measured in the PRU exceeds a pre-configured threshold value Tth in step S1503, transmission power of the PTU is reduced according to a pre-configured method in step S1504.

Meanwhile, it is determined whether the measured $V_{RECT}$ of the PRU is lowered than $V_{RECT\_MIN}$ or is close to within a pre-configuration range according to transmission power reduction of the PTU as shown in FIG. 21 in step S1505.

As a result of the determination, when the measured $V_{RECT}$ of the PRU is lowered than $V_{RECT\_MIN}$ or is close to within a pre-configuration range, a downwardly adjusted voltage configuration value is determined in step S1506. For example, when $V_{RECT}$ measured in the PRU is close to $V_{RECT\_MIN}$ or smaller than $V_{RECT\_MIN}$, a voltage configuration value (e.g., $V_{RECT\_SET}$) is downwardly adjusted and transmitted so as to enable wireless power charging efficiency of a corresponding PRU to increase or enable normal wireless charging to be progressed.

Then, as shown in FIGS. 13 and 14, a PRU dynamic signal including the determined voltage configuration value is generated in step S1507, and the generated PRU dynamic signal is transmitted to the PTU in step S1508.

Referring to FIG. 16, wireless charging is initiated in step S1601 and a current of the PRU is measured in step S1602. The measured value is transmitted to the PTU (e.g., transmitted through the PRU dynamic signal). In the PTU, when a current measured in the PRU exceeds a pre-configured threshold value Ith in step S1603, transmission power of the PTU is reduced according to a pre-configured method in step S1604.

Meanwhile, it is determined whether the measured $V_{RECT}$ of the PRU is lowered below $V_{RECT\_MIN}$ or is close to within a pre-configuration range according to transmission power reduction of the PTU as shown in FIG. 21 in step S1605.

As a result of the determination, when the measured $V_{RECT}$ of the PRU is lowered than $V_{RECT\_MIN}$ or is close to within a pre-configuration range, a downwardly adjusted voltage configuration value is determined in step S1606. For example, when $V_{RECT}$ measured in the PRU is close to $V_{RECT\_MIN}$ or smaller than $V_{RECT\_MIN}$, a voltage configuration value (e.g., $V_{RECT\_SET}$) is downwardly adjusted and transmitted so as to enable wireless power charging efficiency of a corresponding PRU to increase or enable normal wireless charging to be progressed.

Then, as described above, a PRU dynamic signal including the determined downwardly adjusted voltage configuration value is generated in step S1607, and the generated PRU dynamic signal is transmitted to the PTU in step S1608.

Referring to FIG. 17, wireless charging is initiated in step S1701 and a voltage of the PRU is measured in step S1702. The measured value is transmitted to the PTU (e.g., transmitted through the PRU dynamic signal). In the PTU, when a temperature measured in the PRU exceeds a pre-configured threshold value Vth in step S1703, transmission power of the PTU is reduced according to a pre-configured method in step S1704.

Meanwhile, it is determined whether the measured $V_{RECT}$ of the PRU is lowered below $V_{RECT\_MIN}$ or is close to within a pre-configuration range according to transmission power reduction of the PTU as shown in FIG. 21 in step S1705.

As a result of the determination, when the measured $V_{RECT}$ of the PRU is lowered below $V_{RECT\_MIN}$ or is close to within a pre-configuration range, a downwardly adjusted voltage configuration value is determined in step S1706. For example, when $V_{RECT}$ measured in the PRU is close to $V_{RECT\_MIN}$ or smaller than $V_{RECT\_MIN}$, a voltage configuration value (e.g., $V_{RECT\_SET}$) is downwardly adjusted and transmitted so as to enable wireless power charging efficiency of a corresponding PRU to increase or enable normal wireless charging to be progressed.

Then, as described above, a PRU dynamic signal including the determined downwardly adjusted voltage configuration value is generated in step S1707, and the generated PRU dynamic signal is transmitted to the PTU in step S1708.

FIG. 18 is a flowchart illustrating a charging voltage configuration process when a charging mode changes according to a fourth embodiment of the present disclosure.

FIG. 22 is a graph illustrating a state change according to a fourth embodiment of the present disclosure and FIG. 23 illustrates a voltage level in which a charging voltage configuration is changed according to a fourth embodiment of the present disclosure.

Referring to FIG. 22, a value (e.g., $V_{RECT\_SET}$, $V_{RECT\_MIN}$, $V_{RECT\_HIGH}$) Of $V_{RECT}$ previously configured by a static parameter has been configured based on a Continuous Current (CC) mode.

Meanwhile, when the CC mode has been switched into a Continuous Voltage (CV) mode, power applied to the load unit is reduced so that efficiency may be reduced. Therefore, according to the fourth embodiment of the present disclosure, the PRU may request a change of $V_{RECT\_SET}$ to the PTU by considering this. The PTU allows power to be reduced in order to adjust new $V_{RECT\_SET}$ as shown in FIG. 23.

Further, when the CV mode has been switched into a charge completed state, the power applied to the load unit more is further reduced so that unnecessary power does not need to be transmitted. By considering this, the PRU may request a change of $V_{RECT\_SET}$ or $V_{RECT\_MIN}$ to the PTU by considering this. Therefore, the PTU makes power be reduced in order to adjust the new $V_{RECT\_SET}$ so that efficiency can improve.

Referring to FIG. 18, wireless charging is initiated in step S1801 and charging is performed in the CC mode in step S1802. When charging is progressed in some degree and is satisfied with a condition (e.g., 90% charging state) to be switched into the CV mode in step S1803, charging is maintained in the switched CV mode as shown in FIG. 22.

Meanwhile, when the CC mode has been switched into the CV mode as described above, the power applied from the load unit is reduced so that it may reduce efficiency to apply existing $V_{RECT\_SET}$. Therefore, according to the embodiment of the present disclosure, a transmission power of the PTU may be reduced.

That is, a downwardly adjusted voltage configuration value (e.g., $V_{RECT\_SET}$) is determined in step S1804. Then, as described above, a PRU dynamic signal including the determined downwardly adjusted voltage configuration value is generated in step S1805, and the generated PRU dynamic signal is transmitted to the PTU in step S1806.

When charging has been completed in step S1808 while the charging is maintained in the switched CV mode in step S1807, the power applied to the load unit is further reduced so that it may reduce efficiency to apply existing $V_{RECT\_SET}$ for the CV mode. Therefore, according to the embodiment of the present disclosure, the transmission power of the PTU may be further reduced.

That is, the more downwardly adjusted voltage configuration value (e.g., $V_{RECT\_SET}$) is determined in step S1809. Then, as described above, a PRU dynamic signal including the determined downwardly adjusted voltage configuration value is generated in step S1810, and the generated PRU dynamic signal is transmitted to the PTU in step S1811.

Above, in reference to FIGS. 12 to 23, a charging voltage configuration process according to various embodiments of the present disclosure has been described.

Meanwhile, in the embodiments, the $V_{RECT}$ value may be adjusted with various methods.

For example, the PTU may update the $V_{RECT}$ value previously configured through the static parameter through a dynamic parameter included in the PRU dynamic signal. Further, as another method, $V_{RECT}$ configuration values are made to be respectively stored in different registries so as to enable each PRU to memorize the $V_{RECT}$ value.

Meanwhile, an adjustment size unit (Step Size) adjusting the $V_{RECT}$ value will be defined in the following embodiment. However, the present disclosure is not limited thereto.

For example, as described in the wireless charging standard, it is possible to be adjusted to a step size unit by which a change of $I_{tx}$ or $V_{RECT}$ within 5% can occur.

Further, when one measured $V_{RECT}$ among the PRUs intends to deviate from an valid voltage range while the adjustment size unit (step size) by which the 5% change can occur is adjusted, the adjustment size unit is reduced within 3% so as to be adjusted.

Further, in another embodiment, the PTU may be implemented to cause a adjustment size unit of an integer (e.g., (noise level)×(m times)) of a noise level by considering an error range or the noise level of $V_{RECT}$ reported from the PRU to be adjusted.

In addition, the PRU usually monitors $V_{out}$ until $V_{out}$=5V or a chargeable minimum voltage of a battery (e.g., $V_{out}$=4.2V) so as to prevent $V_{RECT}$ being lower than or equal to or lower than the chargeable minimum voltage even though the $V_{RECT}$ continuously is lowered. Also, $V_{RECT\_MIN}$ or $V_{RECT\_SET}$ can be lowered until reaching a pre-configured $V_{RECT}$ of the minimum level to allow a battery of the PRU to be charged.

Although exemplary embodiments of the present disclosure have been illustrated and described, it will be appreciated by those skilled in the art that the embodiments of the present disclosure may be variously modified without departing from the scope of the present disclosure. Therefore, various modified implementations can be made without departing from the substance of the present disclosure claimed in the appended claims, and the modified implementations should not be construed separately from the technical idea or prospect of the present disclosure.

The invention claimed is:

1. A method for controlling a wireless power reception unit (PRU) which receives wireless charging power from a wireless power transmission unit (PTU), the method comprising:

transmitting a first message including a first voltage configuration value to the wireless PTU;

receiving, from the wireless PTU, a charging power which is determined based on the first voltage configuration value by the wireless PTU;

measuring the charging power received from the wireless PTU;

when the measured charging power is smaller than a minimum power level for charging initiation or a difference between the measured charging power and the minimum power level is within a predetermined range, identifying a second voltage configuration value by adjusting the first voltage configuration value;

transmitting a second message including the second voltage configuration value to the wireless PTU; and receiving the charging power of which a size is adjusted based on the second voltage configuration value.

2. The method of claim 1, wherein the second message corresponds to PRU dynamic signal.

3. The method of claim 1, wherein the first voltage configuration value corresponds to at least one of a minimum voltage value VRECT_MIN of a rear end of a rectifier of the wireless PRU, an optimum voltage value VRECT_SET of the rear end of the rectifier of the wireless PRU, and a maximum voltage value VRECT_HIGH of the rear end of the rectifier of the wireless PRU.

4. The method of claim 1, wherein the measuring of the charging power comprises measuring the charging power at a rear end of a rectifier of the wireless PRU.

5. A method for controlling a wireless power reception unit (PRU) which receives wireless charging power from a wireless power transmission unit (PTU), the method comprising:
    transmitting a first message including a first voltage configuration value to the wireless PTU and receiving a charging power corresponding to the first voltage configuration value from the wireless PTU;
    determining whether a charging voltage corresponding to the charging power deviates from a pre-configured valid voltage range;
    in response to determining that the charging voltage has deviated from the pre-configured valid voltage range, identifying a second voltage configuration value by adjusting the first voltage configuration value;
    transmitting a second message including the second voltage configuration value to the wireless PTU; and
    receiving the charging power of which a size is adjusted based on the second voltage configuration value.

6. The method of claim 5, wherein the second message corresponds to a PRU dynamic signal.

7. A method for controlling a wireless power transmission unit (PTU) which allows a wireless power reception unit (PRU) to be charged, the method comprising:
    receiving a first message including a first voltage configuration value from the wireless PRU;
    transmitting a charging power for charging of the wireless PRU in reference to the received first voltage configuration value;
    receiving a second message including a second voltage configuration value which is identified by adjusting the first voltage configuration value upwardly by a pre-configured level at the wireless PRU from the wireless PRU; and
    transmitting the charging power of which a size is adjusted based on the second voltage configuration value.

8. The method of claim 7, wherein the second voltage configuration value is received through a PRU dynamic signal transmitted from the wireless PRU.

9. A wireless power reception unit (PRU) for receiving wireless charging power from a wireless power transmission unit (PTU), the wireless PRU comprising:
    a controller configured to:
    transmit a first message including a first voltage configuration value to the wireless PTU,
    control the PRU to receive a charging power corresponding to the first voltage configuration value from the wireless PTU,
    measure the received charging power,
    when the measured charging power is smaller than a minimum power for charging initiation or a difference between the measured charging power and the minimum power level is within a pre-configured range, identify a second voltage configuration value by adjusting the first voltage configuration value,
    transmit a second message including the second voltage configuration value to the wireless PTU, and
    control the PRU to receive the charging power of which a size is adjusted based on the second voltage configuration value.

10. The wireless PRU of claim 9, wherein the second message corresponds to a PRU dynamic signal.

11. The wireless PRU of claim 9, wherein the first voltage configuration value corresponds to at least one of a minimum voltage value VRECT_MIN of a rear end of a rectifier of the wireless power reception unit, an optimum voltage value VRECT_SET of the rear end of the rectifier of the wireless power reception unit, and a maximum voltage value VRECT_HIGH of the rear end of the rectifier of the wireless power reception unit.

12. The wireless PRU of claim 9, wherein the charging power is measured at a rear end of the rectifier of the wireless power reception unit.

13. A wireless power reception unit (PRU) for receiving wireless charging power from a wireless power transmission unit (PTU), the wireless Power Reception Unit comprising:
    a controller configured to:
    transmit a first message including a first voltage configuration value to the wireless PTU,
    control the PRU to receive a charging power corresponding to the first voltage configuration value from the wireless PTU,
    determine whether a charging voltage corresponding to the charging power deviates from a pre-configured valid voltage range,
    in response to determining that the charging voltage has deviated from the pre-configured valid voltage range, identify a second voltage configuration value by adjusting the first voltage configuration value,
    transmit a second message including the second voltage configuration value to the wireless PTU, and
    control the PRU to receive the charging power of which a size is adjusted based on the second voltage configuration value.

14. A wireless power transmission unit (PTU) for receiving wireless charging power from a wireless power reception unit (PRU), the wireless PTU comprising:
    a communication unit that receives a first message including a first voltage configuration value from the wireless PRU; and
    a power transmission unit that transmits a charging power for charging of the wireless PRU in reference to the received first voltage configuration value,
    wherein the communication unit receives a second message including a second voltage configuration value which is identified by adjusting the first voltage configuration value upwardly by a pre-configured level at the wireless PRU from the wireless PRU, and
    the power transmission unit transmits the charging power of which a size is adjusted based on the second voltage configuration value.

15. The wireless PTU of claim 14, wherein the second message corresponds to a PRU dynamic signal.

\* \* \* \* \*